(12) United States Patent
Yamada et al.

(10) Patent No.: US 7,540,617 B2
(45) Date of Patent: Jun. 2, 2009

(54) ILLUMINATION OPTICAL APPARATUS AND PROJECTION TYPE DISPLAY APPARATUS

(75) Inventors: Ryuuji Yamada, Tokyo (JP); Hiroshi Gouda, Tokyo (JP); Katsuyuki Takeuchi, Tokyo (JP)

(73) Assignees: Kyocera Corporation, Kyoto (JP); NEC Display Solutions, Ltd., Tokyo (JP)

( * ) Notice: Subject to any disclaimer, the term of this patent is extended or adjusted under 35 U.S.C. 154(b) by 183 days.

(21) Appl. No.: 11/270,426

(22) Filed: Nov. 8, 2005

(65) Prior Publication Data

US 2006/0114418 A1   Jun. 1, 2006

(30) Foreign Application Priority Data

Nov. 29, 2004   (JP) .............................. 2004-344865

(51) Int. Cl.
  *G03B 21/14* (2006.01)
(52) U.S. Cl. .................... 353/38; 353/101; 362/283
(58) Field of Classification Search .............. 353/100, 353/101, 122, 38; 362/326–340, 269, 280, 362/283, 331, 281; 359/433–435, 811, 813, 359/814, 821–823
See application file for complete search history.

(56) References Cited

U.S. PATENT DOCUMENTS

| | | | | |
|---|---|---|---|---|
| 6,142,634 A | * | 11/2000 | Ogawa et al. | ................. 353/38 |
| 6,631,039 B2 | * | 10/2003 | Fujimori et al. | ............. 359/819 |
| 6,857,745 B2 | | 2/2005 | Kitabayashi et al. | |
| 6,890,079 B2 | * | 5/2005 | Okuyama et al. | ........... 353/100 |
| 7,177,078 B2 | * | 2/2007 | Yamada et al. | ............. 359/434 |
| 7,213,920 B2 | * | 5/2007 | Matsui et al. | ................. 353/20 |
| 7,236,316 B2 | * | 6/2007 | Miki | .......................... 359/819 |
| 2001/0038483 A1 | * | 11/2001 | Lambert | ..................... 359/196 |
| 2004/0104359 A1 | * | 6/2004 | Komatsuda et al. | ...... 250/492.2 |
| 2004/0189958 A1 | * | 9/2004 | Lee | ............................ 353/101 |
| 2004/0246442 A1 | * | 12/2004 | Lee et al. | ....................... 353/30 |
| 2006/0114676 A1 | * | 6/2006 | Yamada et al. | ............. 362/268 |

FOREIGN PATENT DOCUMENTS

| JP | 05-013300 | | 1/1993 |
|---|---|---|---|
| JP | 07-161601 | | 6/1995 |
| JP | 2001201792 | A | 7/2001 |
| JP | 2001222061 | A | 8/2001 |
| WO | 2004008241 | A1 | 1/2004 |

* cited by examiner

*Primary Examiner*—William C Dowling
(74) *Attorney, Agent, or Firm*—Hogan & Hartson LLP

(57) ABSTRACT

An illumination optical apparatus and a projection type display apparatus capable of preventing an image on boundary lines of a fly-eye lens from deviating from a designed position and preventing unevenness of brightness is provided: wherein a first lens holding member holding said first fly-eye lens; a second lens holding member joined to said first lens holding member, and holding said second fly-eye lens; and a third lens holding member joined to said second lens holding member, and holding an optical lens are provided; and said first lens holding member and said second lens holding member are joined to be relatively rotatable about an optical axis.

7 Claims, 18 Drawing Sheets

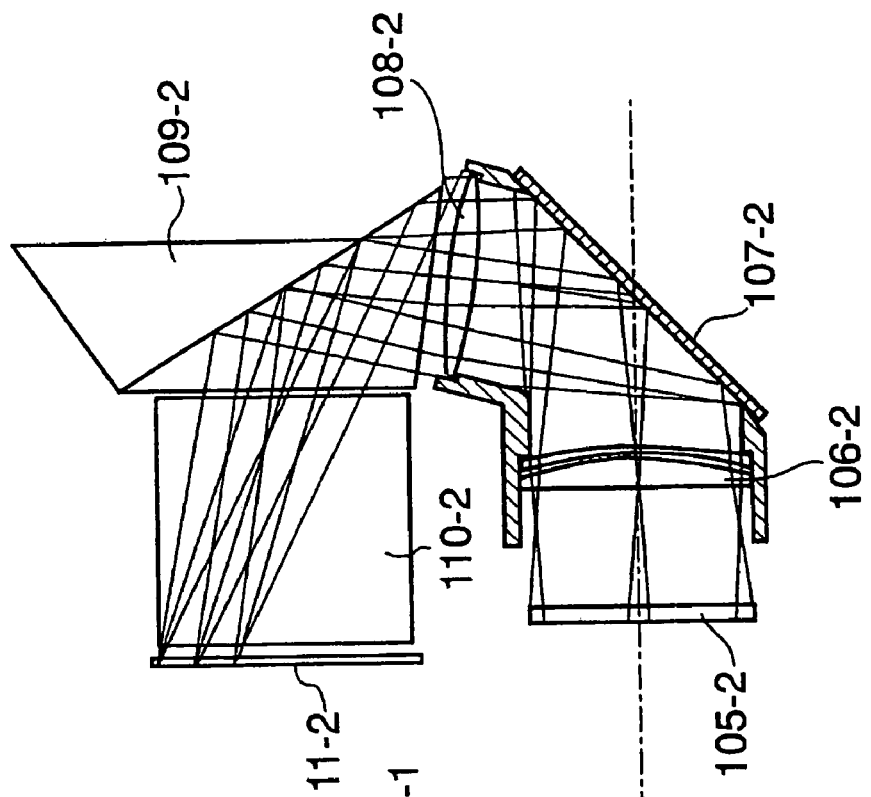
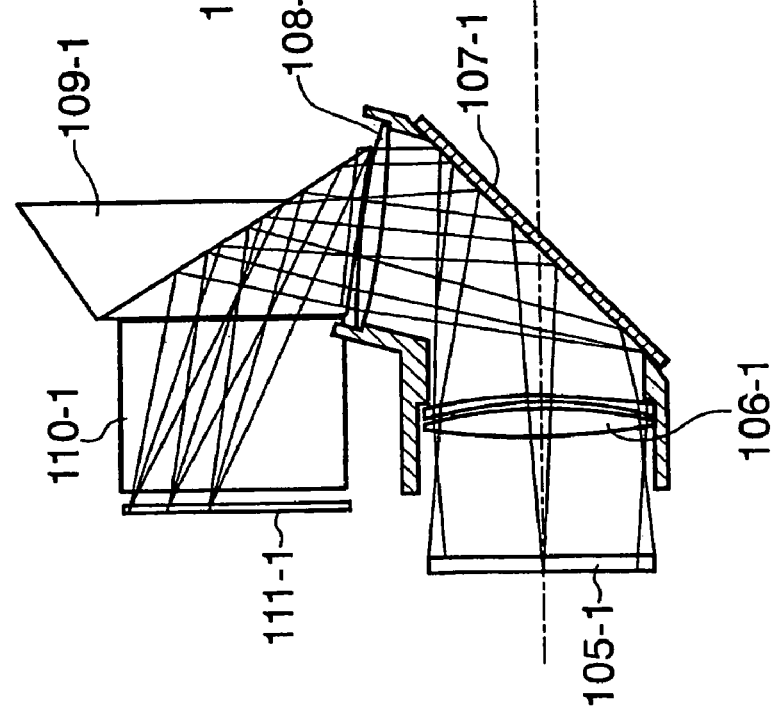

STATE 1 IN FIRST EMBODIMENT

STATE 2 IN FIRST EMBODIMENT

STATE 1 IN SECOND EMBODIMENT

STATE2 IN SECOND EMBODIMENT

SPHERICAL ABERRATION

F 3.0

FIELD CURVATURE

Y=12.0

ILLUMINATION OPTICAL APPARATUS AND PROJECTION TYPE DISPLAY APPARATUS

BACKGROUND OF THE INVENTION

1. Field of the Invention

The present invention relates to an illumination optical apparatus including a fly-eye lens and a projection type display apparatus using the same.

2. Description of the Related Art

For example, an illumination optical apparatus used in a projection type display apparatus (projector), etc. provided with a liquid crystal display device is configured to include a pair of fly-eye lenses.

In an illumination optical apparatus including a pair of fly-eye lenses, the pair of fly-eye lenses uniformize a light intensity distribution of an illumination light from a light source and irradiate to an illumination surface of, for example, a liquid crystal display panel as a spatial light modulation device, etc.

As an illumination optical apparatus of this kind, for example, first to third optical apparatuses for illumination or exposure explained below have been proposed.

The first optical apparatus is an illumination optical apparatus configured that a fly-eye lens is arranged on an optical path between a so-called optical integrator and an illumination surface. The fly-eye lens is composed of two fly-eye members and the fly-eye members are rotatable and movable in a predetermined direction.

The second optical apparatus is a projection exposure apparatus, wherein an aperture is formed in a rear stage of a fly-eye lens and a light for illuminating a mask surface is uniformized (The Japanese Unexamined Patent Publication No. 5-13300). It is configured that a mirror changes an illumination direction of a light transmitted through the fly-eye lens. In this apparatus, the fly-eye lens is made rotatable to obtain timing superposition of light source lights on the mask.

The third optical apparatus is an illumination optical apparatus configured to include a mirror for changing a direction of an illumination light (The Japanese Unexamined Patent Publication No. 7-161601).

According to the optical apparatuses of the related art explained above, however, although the configuration of rotating a fly-eye lens is provided, a molding error and an inclination error at installation, etc. arise in the fly-eye lens, and this results in a disadvantage that an image on boundary lines of the fly-eye lens deviates from a designed position.

When applying the illumination optical apparatus to a projection type display apparatus, there is a disadvantage that brightness unevenness arises when projected on a screen due to the positional deviation.

SUMMARY OF THE INVENTION

It is desired to provide an illumination optical apparatus and a projection type display apparatus, wherein deviation of an image on boundary lines of a fly-eye lens from the designed position can be prevented and unevenness of brightness can be prevented.

To respond to the above demand, according to a first aspect of the present invention, there is provided an illumination optical apparatus including a first fly-eye lens; a second fly-eye lens; a first lens holding member holding the first fly-eye lens; a second lens holding member joined to the first lens holding member, and holding the second fly-eye lens; and a third lens holding member joined to the second lens holding member, and holding an optical lens; wherein the first lens holding member and the second lens holding member are joined to be relatively rotatable about an optical axis.

According to a second aspect of the present invention, there is provided an illumination optical apparatus including a first fly-eye lens; a second fly-eye lens; a first lens holding member holding the first fly-eye lens; a second lens holding member joined to the first lens holding member, and holding the second fly-eye lens; a third lens holding member joined to the second lens holding member, and holding an optical lens; a first engaging member provided in a portion of the second lens holding member, where the portion faces to the first lens holding member and is aparted from an optical axis by a predetermined distance; a second engaging member provided in a portion of the second lens holding member, where the portion faces to the third lens holding member and is aparted from an optical axis by a predetermined distance; a first engaged portion to be engaged with the first engaging member, provided in a portion of the first lens holding member, where the portion faces to the second lens holding member; a second engaged portion to be engaged with the second engaging member, provided in a portion of the first lens holding member, where the portion faces to the second lens holding member.

Preferably, the first engaging member and the first engaged portion can be engaged to be rotatable about the optical axis in a predetermined range; the second engaging member and the second engaged portion to be engaged can be engaged to be rotatable about the optical axis in a predetermined range; a first fixing portion capable of fixing the first lens holding member and the second lens holding member when the first engaging member and the first engaged portion are in an engaged state is provided; and a second fixing portion capable of fixing the second lens holding member and the third lens holding member when the second engaging member and the second engaged portion to be engaged are in an engaged state is provided.

Preferably, the third lens holding member holds a first lens group and a second lens group, a mirror for bending an optical path being provided therebetween; and the first fly-eye lens, the second fly-eye lens, the first lens group, the mirror and the second lens group are arranged along the optical path.

According to a third aspect of the present invention, there is provided a projection type display apparatus, including a light source emitting an illumination light; an image display device forming an image by being irradiated with the illumination light; an illumination optical apparatus irradiating the illumination light from the light source to the image display device; and a projection optical system projecting an image formed by the image display device; wherein the illumination optical apparatus includes: a first fly-eye lens; a second fly-eye lens; a first lens holding member holding the first fly-eye lens; a second lens holding member joined to the first lens holding member, and holding the second fly-eye lens; a third lens holding member joined to the second lens holding member, and holding an optical lens; a first engaging member provided in a portion of the second lens holding member, where the portion faces to the first lens holding member and is aparted from an optical axis by a predetermined distance; a second engaging member provided in a portion of the second lens holding member, where the portion faces to the third lens holding member and is aparted from an optical axis by a predetermined distance; a first engaged portion to be engaged with the first engaging member, provided in a portion of the first lens holding member, where the portion faces to the second lens holding member; a second engaged portion to be engaged with the second engaging member, provided in a portion of the first lens holding member, where the portion faces to the second lens holding member.

Preferably, the third lens holding member holds a first lens group and a second lens group, a mirror for bending an optical path being provided therebetween; and the first fly-eye lens, the second fly-eye lens, the first lens group, the mirror and the second lens group are arranged along the optical path.

Preferably, a prism is arranged in an illumination light emission side of the second lens group.

According to the present invention, it is possible to prevent an image on boundary lines of a fly-eye lens from deviating from a designed position and unevenness of brightness can be prevented.

BRIEF DESCRIPTION OF DRAWINGS

These and other objects and features of the present invention will become clearer from the following description of the preferred embodiments given with reference to the attached drawings, in which:

FIG. 9A and FIG. 9B are views of an optical path of a relay lens system in a first state and that in a second state according to the first embodiment;

FIG. 11A and FIG. 11B are views wherein FIG. 9A, FIG. 9B, FIG. 10A and FIG. 10B are put together;

DESCRIPTION OF THE PREFERRED EMBODIMENT

Figure 1:
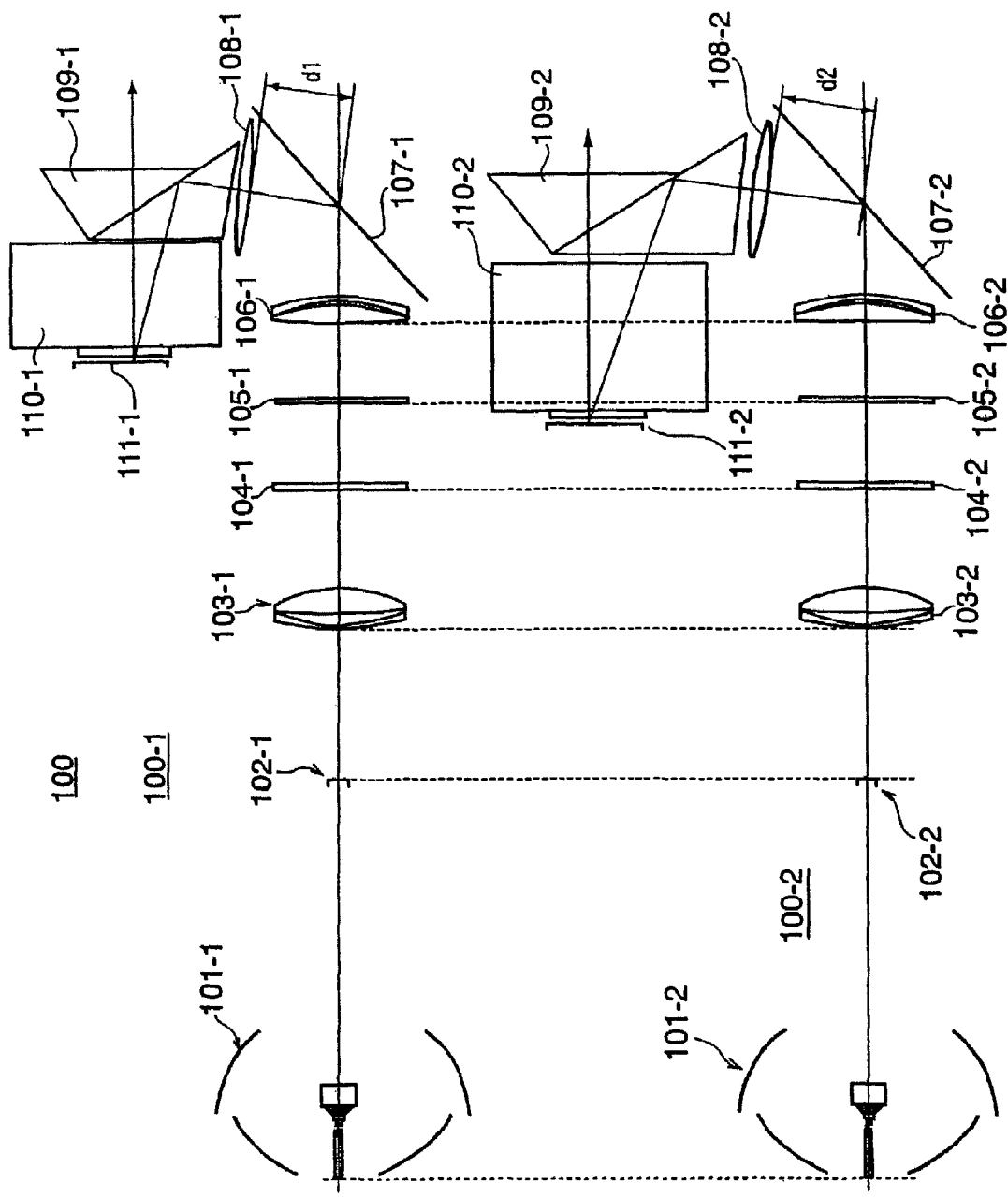
FIG. 1A and FIG. 1B are views of an optical system showing the configuration in a first state and that in a second state of a projection type display apparatus according to a first embodiment of the present invention.

Below, embodiments of the present invention will be explained with reference to the attached drawings.

First Embodiment

FIG. 1A and FIG. 1B are views of an optical system showing the configuration in a first state and that in a second state of a projection type display apparatus according to a first embodiment of the present invention: wherein FIG. 1A shows the configuration in the first state and FIG. 1B shows the configuration in the second state.

Note that the unit is "mm" in a distance, length and interval, etc. in the present embodiment.

A projection type display device 100 of the present embodiment basically includes a light source 101, aperture 102, collimeter lens 103, first fly-eye lens 104, second fly-eye lens 105, first relay lens group (also referred to as a first lens group) 106, loopback mirror 107, second relay lens group (also referred to as a second lens group) 108, TIR prism 109, color separation/composition prism 110 and reflection type image display device 111.

A projection type display apparatus 100-1 in the first state of the present embodiment has a light source 101-1, aperture 102-1, collimeter lens 103-1, first fly-eye lens 104-1, second fly-eye lens 105-1, first relay lens group (also referred to as a first lens group) 106-1, loopback mirror 107-1, second relay lens group (also referred to as a second lens group) 108-1, TIR prism 109-1, color separation/composition prism 110-1 and reflection type image display device 111-1.

Similarly, a projection type display apparatus 100-2 in the second state of the present embodiment has a light source 101-2, aperture 102-2, collimeter lens 103-2, first fly-eye lens 104-2, second fly-eye lens 105-2, first relay lens group (also referred to as a first lens group) 106-2, loopback mirror 107-2, second relay lens group (also referred to as a second lens group) 108-2, TIR prism 109-2, color separation/composition prism 110-2 and reflection type image display device 111-2.

In the projection type display apparatus 100-1 in the first state and that 100-2 in the second state of the present embodiment, the first fly-eye lens 104 (-1 and -2) and the second fly-eye lens 105 (-1 and -2) are arranged at each other's focal points.

Also, in the projection type display apparatus 100-1 in the first state and that 100-2 in the second state of the present embodiment, the first relay lens group 106 (-1 and -2) and the second relay lens group 108 (-1 and -2) are arranged over the mirror 107 (-1 and -2) for bending an optical path.

In the projection type display apparatus of the present embodiment, the first fly-eye lens and the second fly-eye lens are arranged at each other's focal points, and a relay lens systems having the same focal length but different back focus are arranged in the same way as explained above, so that a case of the lens can be used in common even when a shape of the image display device and an optical path length in the prism are different.

Specifically, to accept prisms having different optical path lengths, each of first and second relay lens groups having the same focal length but different back-focus is configured to satisfy the condition formulas below.

[Formula 1]

$$e1=-(\emptyset-\emptyset 11-\emptyset 12)/(\emptyset 11 \times \emptyset 12) \quad (1)$$

$$e2=-(\emptyset-\emptyset 21-\emptyset 22)/(\emptyset 21 \times \emptyset 22) \quad (2)$$

$$\emptyset 11=(1-fb1\times\emptyset)/e1 \quad (3)$$

$$\emptyset 21=(1-fb2\times\emptyset)/e2 \quad (4)$$

$$0.95 < e1/e2 < 1.05 \quad (5)$$

$$1.1\times(1-e1\times\emptyset)/\emptyset < fb < f\times 0.9 \quad (6)$$

Here, $\emptyset$ indicates a refracting power of the entire relay lens system (inverse number of focal length), $\emptyset 11$ indicates a refracting power of a first lens group in the first state, $\emptyset 12$ indicates a refracting power of the second lens group in the first state, $\emptyset 21$ indicates a refracting power of the first lens group in the second state, $\emptyset 22$ indicates a refracting power of the second lens group in the second state, e1 indicates a paraxial inter-group distance between the first lens group and the second lens group in the first state, e2 indicates a paraxial inter-group distance between the first lens group and the second lens group in the second state, fb1 indicates a paraxial back focus of the relay lens system against an infinite light flux in the first state and fb2 indicates a paraxial back focus of the relay lens system against an infinite light flux in the second state, respectively.

By satisfying the above conditions, an optical system, wherein an optical element can be arranged in a common case even when a shape of the optical element is changed, can be provided in the projection type display apparatus of the present embodiment.

The above condition formulas (1) to (5) express paraxial relationships of the first lens group and the second lens group when two different relay lens systems have the same focal length but different back-focus.

The formulas (1) to (4) are general paraxial formulas and the formula (5) expresses a condition, under which a distance between the first lens group and the second lens group does not change largely between the first state and the second state and a common case can be used.

As a result, only a back-focus can be changed in a state of maintaining the focal length, so that it is possible to accept a change of the optical path length of the prism.

The formula (6) is a condition, under which refracting powers of the first lens group and the second lens group can be suitably distributed and preferable focusing performance as a relay lens system can be obtained.

When a back-focus becomes nearer than the lower limit of the formula (6), a refracting power of the second lens group becomes weak and the refracting power leans to the first group, which is not preferable in terms of aberration correction. While, when the back-focus excesses the upper limit, a refracting power of the first lens group becomes weak and the refracting power leans to the second lens group, which is not preferable, either.

When changing a size of the image display device, to keep the arrangement of fly-eye lenses to be constant, it is necessary that the two fly-eye lenses satisfy the condition of having the same shape, being made by the same material, arranged approximately at each other's focal points, and only a shape of the cell is changed along with the change of the image display device.

An illumination area of the illumination optical system is formed as a result that a shape of a lens cell aperture of the first fly-eye lens is enlarged to be projected on the image display device by the second fly-eye lens and the relay lens system. Since the magnification power is determined by a ratio of a focal length of the second fly-eye lens to a focal length of the relay lens system, by keeping the focal lengths of the fly-eye lens and the relay lens system to be constant, the magnification power can be kept constant. By keeping the magnification power constant, it becomes possible to respond to a change of a size of the image display device only by changing a shape of the aperture of the fly-eye lens cell.

By keeping the focal length of the relay lens system constant, the mutual arrangement can be always constant regardless of a shape of the image display device and a back-focus of the relay lens system.

The illumination optical apparatus (system) of the present embodiment having the characteristics as explained above is configured to include a first fly-eye lens 104, a second fly-eye lens 105, a first lens group 106, a mirror 107 and a second lens group 108.

A holding mechanism for fixing one of the first fly-eye lens 104 and the second fly-eye lens 105 and adjusting the other by rotating is applied, so that respective focal lengths, etc. explained above and other conditions are satisfied, a mutual arrangement is always kept to be constant, a molding error and installation error of the fly-eye lenses are absorbed, deviation of an image on boundary lines of the fly-eye lenses from a designed position can be prevented, and unevenness of brightness can be suppressed.

Below, the holding mechanism will be explained with reference to FIG. 2 to FIG. 7.

The holding mechanism basically has a mechanism, wherein the first fly-eye lens 104 is rotated about a reference axis (for example, an optical axis) and fixed in a state that the second fly-eye lens 105 is fixed, and a mechanism, wherein the first fly-eye lens 104 and the second fly-eye lens 105 are rotated at a time in a state that a relative positional relationship of the first fly-eye lens 104 and the second fly-eye lens 105 is maintained.

Figure 2:
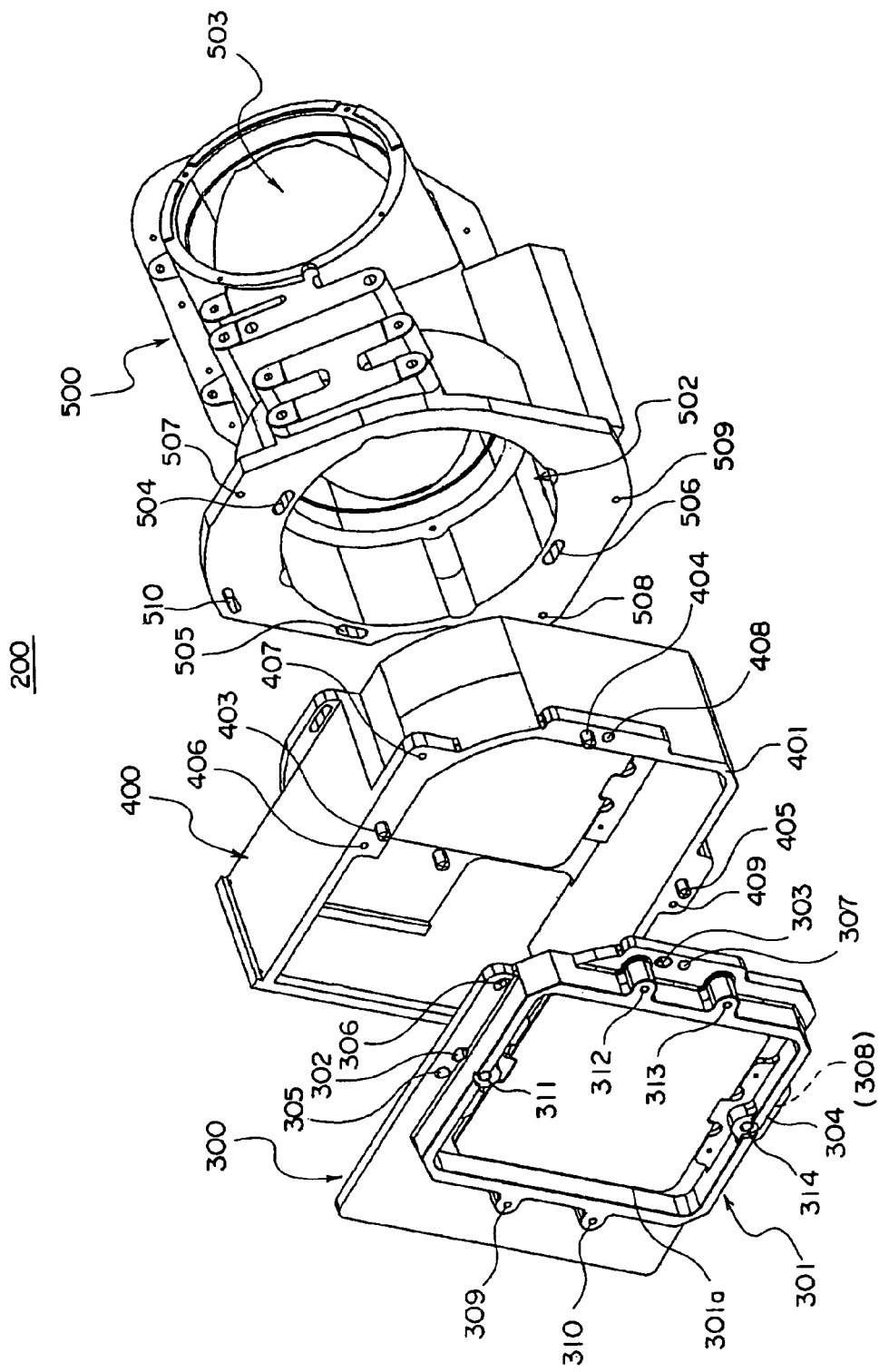
FIG. 2 is a disassembled perspective view of a holding mechanism in a state of not holding a fly-eye lens of an illumination optical apparatus.
Figure 3:
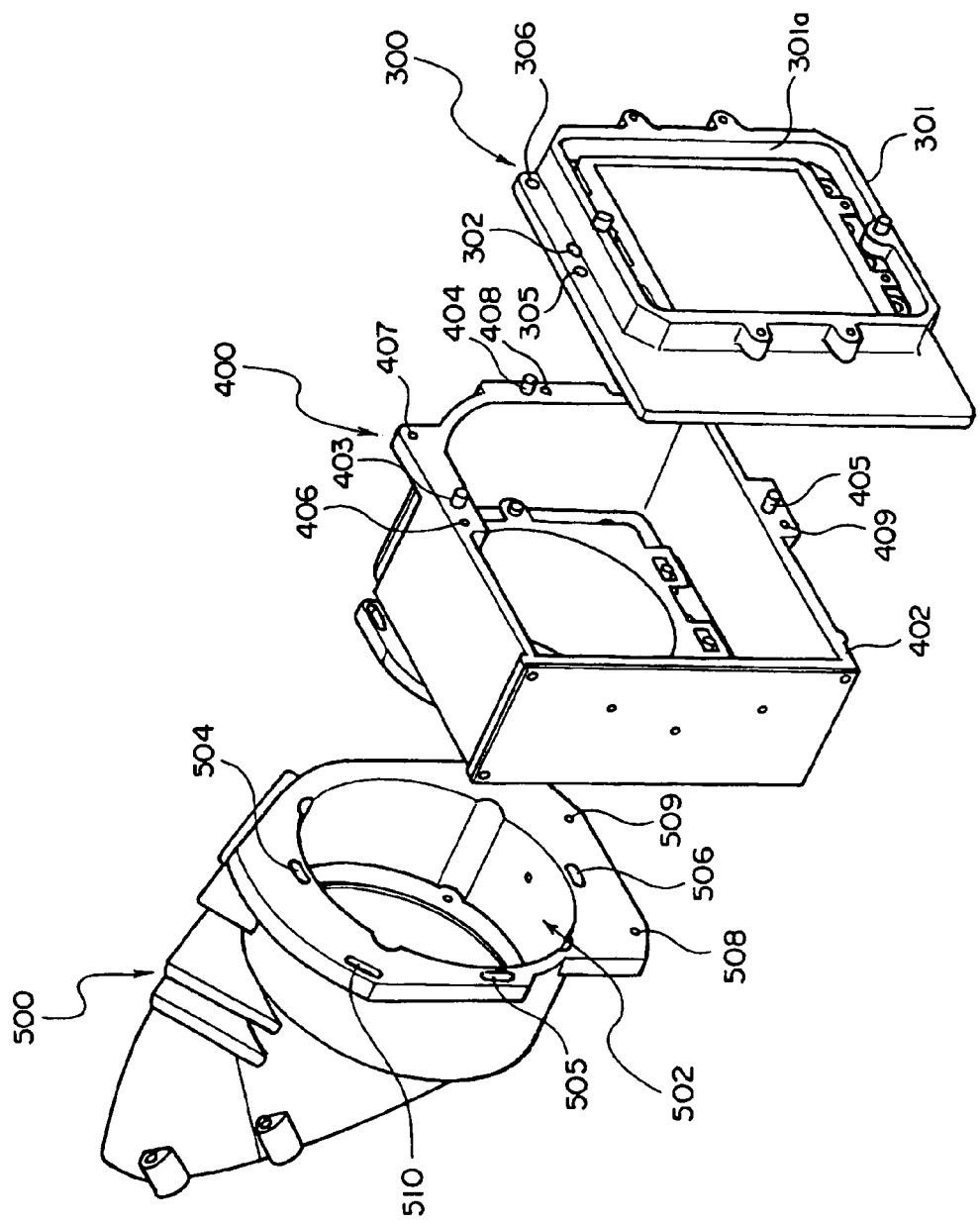
FIG. 3 is a disassembled perspective view of a holding mechanism in a state of not holding a fly-eye lens of an illumination optical apparatus.

FIG. 2 and FIG. 3 are disassembled perspective views of a holding mechanism in a state of not holding a fly-eye lens of an illumination optical apparatus.

Figure 4:
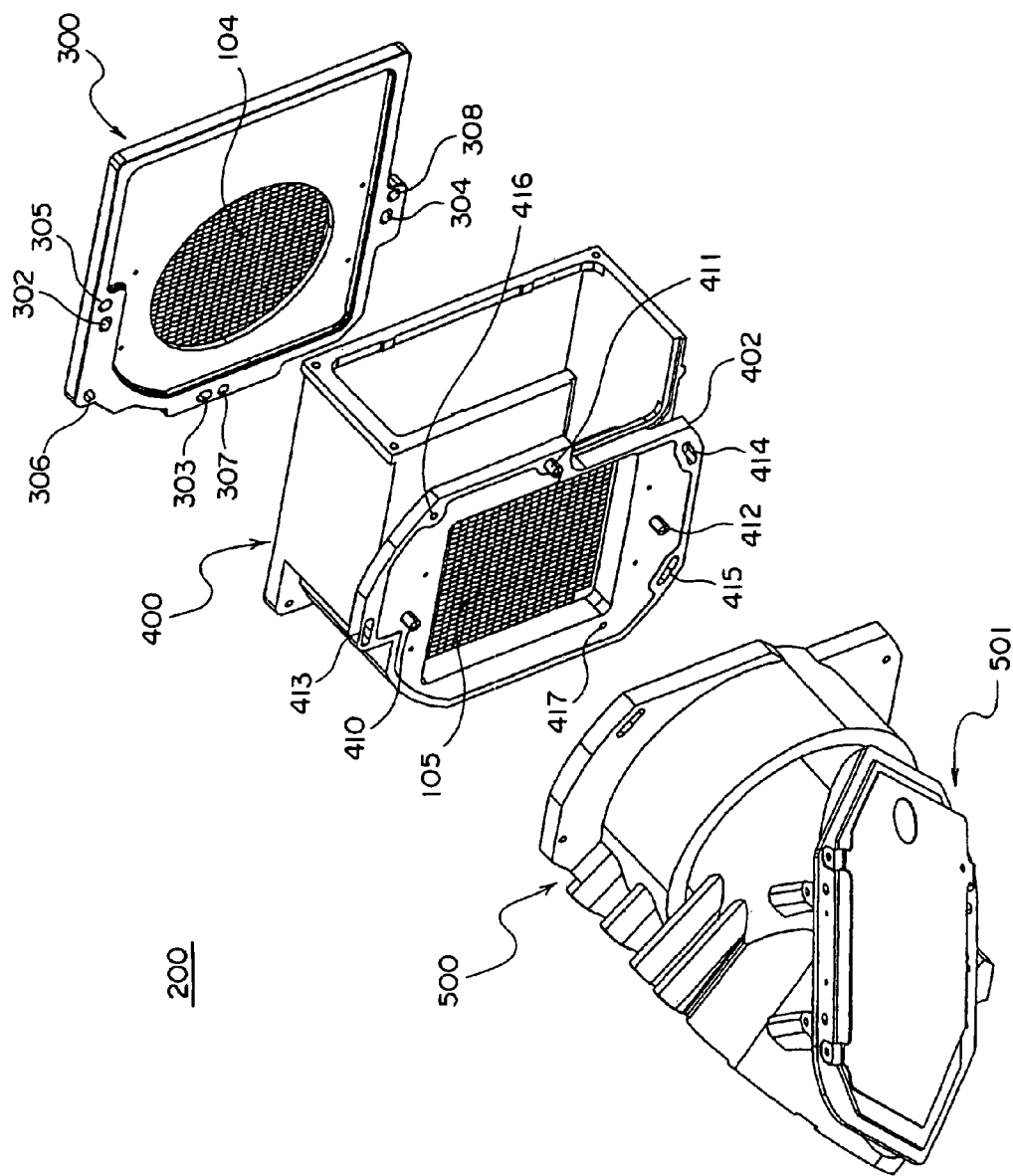
FIG. 4 is a disassembled perspective view of a holding mechanism in a state of holding a fly-eye lens of an illumination optical apparatus.
Figure 5:
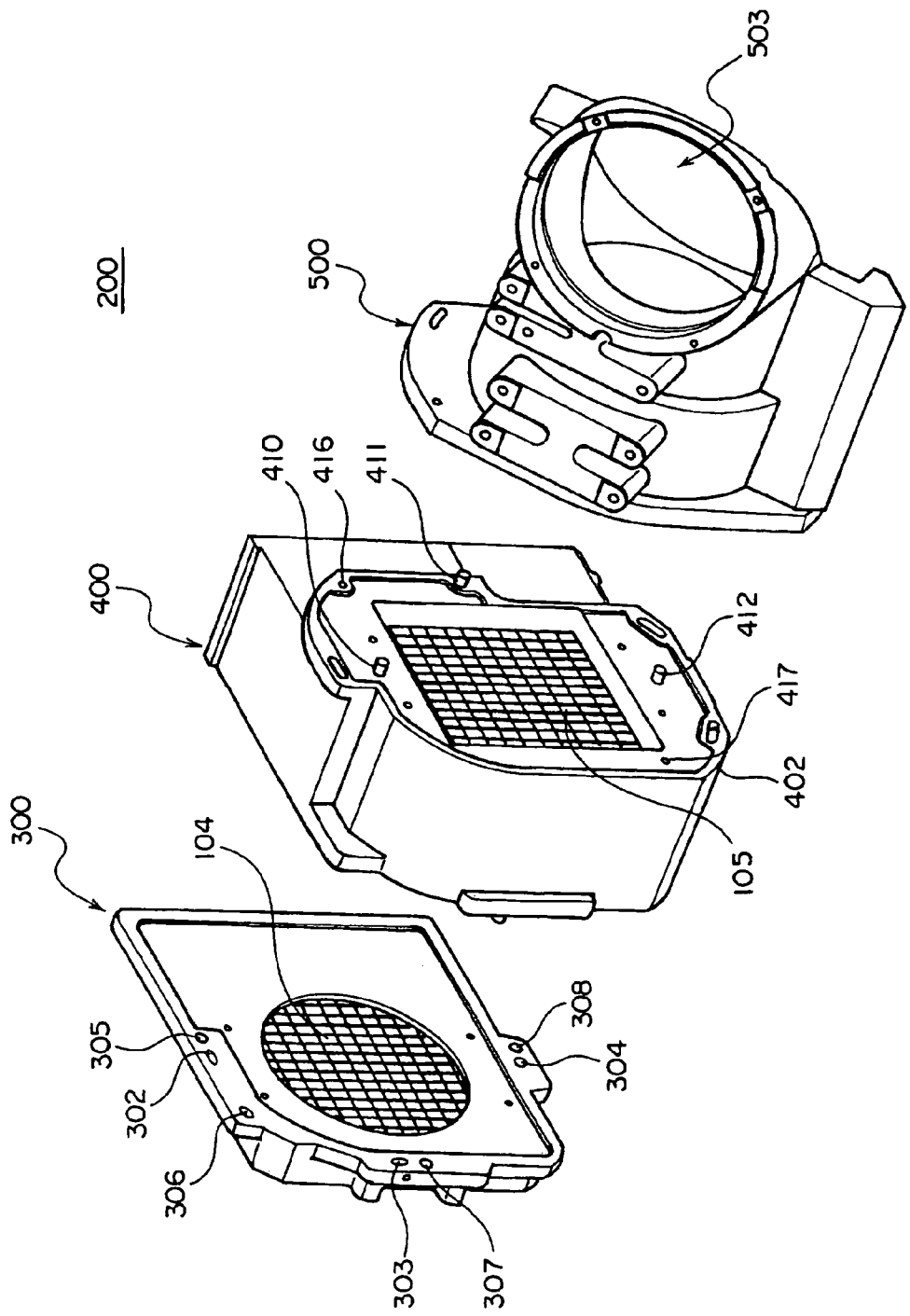
FIG. 5 is a disassembled perspective view of a holding mechanism in a state of holding a fly-eye lens of an illumination optical apparatus.

FIG. 4 and FIG. 5 are disassembled perspective views of a holding mechanism in a state of holding a fly-eye lens of an illumination optical apparatus.

Figure 6:
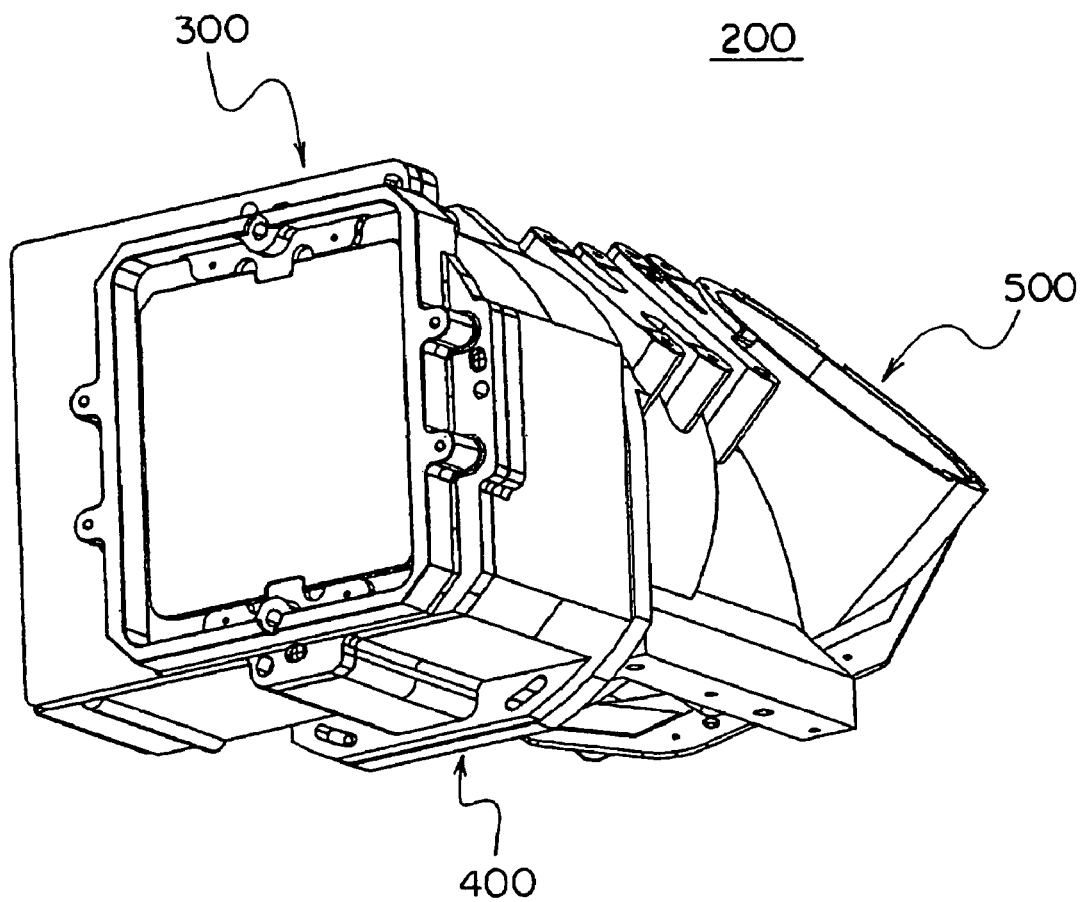
FIG. 6 is a perspective view showing an assembled state of the holding mechanism of the illumination optical apparatus.
Figure 7:
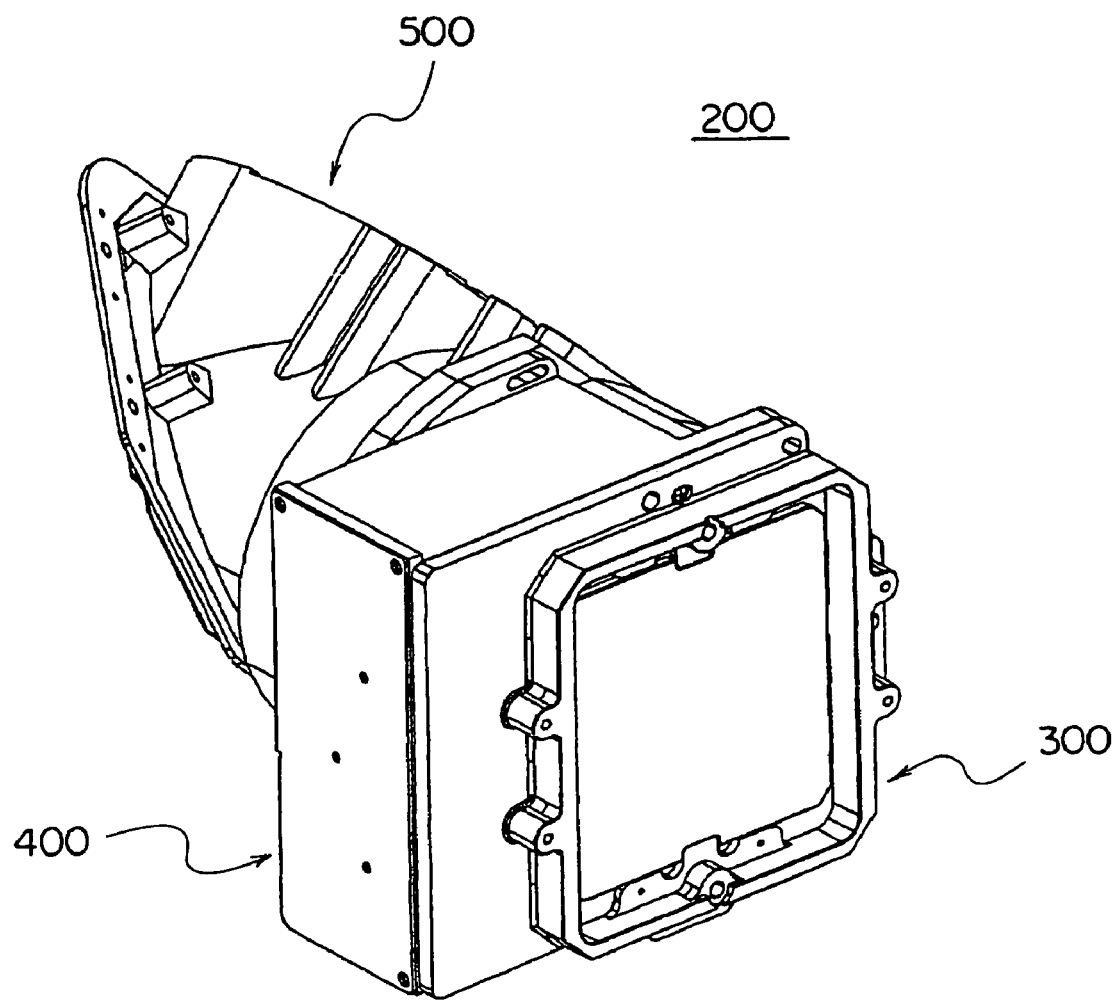
FIG. 7 is a perspective view showing an assembled state of the holding mechanism of the illumination optical apparatus.

FIG. 6 and FIG. 7 are perspective views showing an assembled state of the holding mechanism of the illumination optical apparatus.

The holding mechanism 200 includes, as shown in the drawings, a first lens holding member 300 for holding the first fly-eye lens 104, a second lens holding member 400 joined to the first lens holding member 300 and for holding the second fly-eye lens 105, and a third lens holding member 500 joined to the second lens holding member 400 and for holding the first relay lens group 106, the mirror 107 and the second relay lens group 108.

The first lens holding member 300 is formed to be a square thin plate shape, wherein a square opening portion 301a is formed on a part being a little aside to the right in FIG. 2 and a mounting portion 301 for mounting the first fly-eye lens 104 is formed.

First engaged portions 302, 303 and 304 (refer to FIG. 4) formed to be a long hole at the center of an upper margin, the center of a right margin and the center of a lower margin (not shown in FIG. 2 and FIG. 3) of the mounting portion 301 are formed for engaging with first engaging members formed to be a boss on the second lens holding member 400.

Holes 305 to 308 to be inserted by screws for joining the first lens holding member 300 to the second lens holding member 400 and fixing are formed on the immediate left of the first engaged portion 302 and on a right corner part on the upper margin on the mounting portion 301 in FIG. 2, on a part immediately below the first engaged portion 303 on the right margin of the mounting portion 301, and on a part close to the first engaged portion 304 on the lower margin of the mounting portion 301.

Furthermore, internal thread portions 309 to 314 for fixing the first fly-eye lens 104 with screws are formed around the mounting portion 301.

The second lens holding member 400 has a box shape having a predetermined thickness, on which a first lens holding member side surface 401 for joining to the first lens holding member 300 and fixing the same, and a third lens holding member side surface 402 for joining to the third lens holding member 500 and fixing the same are formed by keeping a predetermined distance, and the first lens holding member side surface 401 and the third lens holding member side surface 402 are bored consecutively.

The second fly-eye lens 105 is mounted to the third lens holding member side surface 402 and fixed, as shown in FIG. 6 and FIG. 7.

A distance from the first lens holding member side surface 401 to the third lens holding member side surface 402 of the second lens holding member 400 is set to be a value, for example, by which the second fly-eye lens 105 positions at a focal point of the first fly-eye lens 104 when the first lens holding member 300 attached with the first fly-eye lens 104 is joined and fixed to the first lens holding member side surface 401.

On the first lens holding member side surface 401, first engaging members 403, 404 and 405 formed to be a boss (cylindrical projection) shape for engaging with the first engaged portions 302, 303 and 304 formed on the first lens holding member 300 are formed on the upper margin, on the right margin and on the lower margin in FIG. 2.

Internal thread portions 406, 407, 408 and 409, to which screws penetrating through the holes 305, 306, 307 and 308 formed on the first lens holding member 300 are inserted to be screwed, are formed on the upper margin, on the right margin and on the lower margin in FIG. 2.

The holes 305 to 308 on the first lens holding member 300 and the internal thread portions 406 to 409 on the second lens holding member 400 compose a first fixing portion.

On the second lens holding member side surface 402, as shown in FIG. 4 and FIG. 5, second engaging members 410, 411 and 412 formed to be a boss (cylindrical projection) shape for engaging with the second engaged portions formed on the third lens holding member 500 are formed on the upper margin, on the right martin and on the lower margin in FIG. 4 and FIG. 5.

On the second lens holding member side surface 402, holes 413, 414 and 415 for being inserted by screws for joining and fixing the second lens holding member 400 to the third lens holding member 500 are formed at the center on the upper margin and both corner parts on the lower margin in FIG. 4 and FIG. 5. The holes 413 to 415 are formed to be a long hole, and it is possible to perform a fixing operation of the third lens holding member 400 while rotating the second lens holding member 400 in a predetermined range.

Also, on the second lens holding member side surface 402, internal thread portions 416 and 417 for being inserted by screws penetrating through the long holes formed on the third lens holding member 500 are formed at the upper right corner part and the lower left corner part in FIG. 4 and FIG. 5.

The third lens holding member 500 is formed to be a cylindrical shape bent at a predetermined angle, wherein a bending portion 501 to be attached with the mirror 107 is cut at a predetermined angle as shown in FIG. 4.

It is configured that the mirror 107 is arranged between the first relay lens group 106 and the second relay lens group 108, and the first relay lens group 106 is installed from the fly-eye lens side and the second relay lens group 108 is installed from the TIR prism side, respectively.

Specifically, the first relay lens group 106 is installed in an opening 502 of one end side (fly-eye lens side) and the second relay lens group 108 is installed in an opening 503 on the other end side (TIR prism side) of the bent holding member 500.

Around the opening 502 of the third lens holding member 500, second engaged portions 504, 505 and 506 shaped to be a long hole for engaging with the second engaging members 410, 411 and 412 shaped to be a boss (cylindrical projection) formed on the third lens holding member side surface 402 of the second lens holding member 400 are formed on the upper margin, on the left margin and the lower margin in FIG. 2.

Also, internal thread portions 507, 508 and 509 for being inserted by screws penetrating through the holes 413, 414 and 415 formed on the second lens holding member side surface 402 of the second lens holding member 400 are formed on the upper margin and both corner parts on the lower margin.

Around the opening 502 of the third lens holding member 500, a hole 510 (511) shaped to be a long hole for being penetrated through by a screw to be inserted to the internal thread portions 416 and 417 formed on the third lens holding member side surface 402 of the second lens holding member 400 is formed.

The holes 413 to 415 of the second lens holding member 400 and the internal thread portions 507 to 509 of the third lens holding member 500 compose the second fixing portion. The holes 510 and 511 of the third lens holding member 500 and the internal thread portions 416 and 417 of the second lens holding member 400 compose the second fixing portion.

In the holding mechanism 200 configured as above, the first engaging members 403 to 405 formed on the first lens holding member side surface 401 of the second lens holding member 400 can be engaged with the first engaged portions 302 to 304 formed on the first lens holding member 300 so as to be rotatable about an optical axis (reference axis) in a predetermined range.

In the same way, the second engaging members 410 to 412 formed on the third lens holding member side surface 402 of the second lens holding member 400 can be engaged with the second engaged portions 504 to 506 formed on the third lens holding member 500 so as to be rotatable about an optical axis in a predetermined range.

When the first engaging member 403 to 405 and the first engaged portions 302 to 304 are in an engaged state, the holes 305 to 308 formed on the first lens holding member 300 and the internal thread portions 406 to 409 formed on the second lens holding member 400 restrain rotation in the predetermined range, fix with not shown screws the first lens holding member 300 and the second lens holding member and function as a first fixing portion.

In the same way, when the second engaging members 410 to 412 formed on the third lens holding member side surface 402 of the second lens holding member 400 and the second engaged portions 504 to 506 formed on the third lens holding member 500 are in an engaged state, the holes 413 to 415, internal thread portions 416 and 417 formed on the lens holding member side surface 402 of the second lens holding member 400, holes 510 and 511 and internal thread portions 507 to 509 formed on the third lens holding member 500 restrain rotation in the predetermined range and fix with not shown screws the second lens holding member 400 and the third lens holding member 500 and function as a second fixing portion.

Due to the holding mechanism 200 configured as above, one of the first fly-eye lens 104 and the second fly-eye lens 105 can be fixed and the other can be adjusted by rotating. As a result, adjustment can be attained by a simple operation, so that respective focal lengths, and other conditions are satisfied, the mutual arrangement is always maintained to be constant, a molding error and installation error of the fly-eye lenses are absorbed, deviation of an image on boundary lines of the fly-eye lenses from the designed position can be prevented and, moreover, unevenness of brightness can be prevented.

As explained above, when the two fly-eye lenses are arranged at each other's focal points and a power arrangement of the relay lens group satisfies the condition formulas (1) to (6), a common case can be used to respond to changes of a size of an image display device and an optical path length of a prism.

Below, the specific configuration and function of each part in FIG. 1, an evaluation based on specific values of the condition formulas and consideration thereon will be explained in order.

Note that, in FIG. 1A and FIG. 1B, the image display devices 111-1 and 111-2 are reflection type image display devices, such as a DMD, wherein the image display ranges are different. Also, the TIR prisms 109-1 and 109-2 and the color separation/composition prisms 110-1 and 110-2 have different optical path lengths.

The light source 101 (-1 and -2) is configured to include, for example, a halogen lamp, a metal halide lamp and a ellipsoidal reflector and irradiates a white illumination light.

The aperture 102 (-1 and -2) is a rectangular aperture and blocks an unnecessary light flux in an illumination light from the light source 101. While not illustrated, a converged light from the ellipsoidal reflector of the light source 101 irradiates the aperture 102.

The collimeter lens 103 (-1 and -2) converts the converged light irradiated to the aperture 102 to a parallel light flux to be irradiated to the first fly-eye lens 104.

Note that the configuration including the ellipsoidal reflector, aperture 102 and collimeter lens 103 can be also configured by a light source of the rotary paraboloidal reflector.

The first fly-eye lenses 104 (-1 and -2) and the second fly-eye lenses 105 (-1 and -2) have the same focal length due to being formed by the same material, having the same thickness and lens cell surface shape, and maintain the same positional relationship in the first state and in the second state due to being arranged at each other's focal points.

Furthermore, as a result that the lens cell aperture shape is made to have an approximately homologous shape of the image display device shape, it is possible to accept an image display device having a different size.

The first lens group 106 (-1 and -2) and the second lens group 108 (-1 and -2) respectively form a relay lens system, and the first lens group 106 (-1 and -2) and the second lens group 108 (-1 and -2) are arranged over the mirror 107 (-1 and -2), respectively.

The focal lengths of the entire relay lens in the first state and in the second state are equal, but the back-focus is different to be in accordance with an optical path length of each prism.

Dotted lines in FIG. 1 indicate that the respective optical elements are arranged in the same way in the first state and in the second state.

As shown in FIG. 1, the first fly-eye lens 104 (-1 and -2), the second fly-eye lens 105 (-1 and -2), an incident surface of the first lens group 106 (-1 and -2) of the relay lens system and the mirror 107 (-1 and -2) are arranged in this order from the side of the collimeter lens 103 (-1 and -2) on an identical optical axis being free of the influence of reflecting effects.

Also, by making an interval (distance) d1 from the mirror 107-1 to the light incident surface of the second relay lens group 108-1 in the first state equal to an interval (distance) d2 from the mirror 108-2 to the light incident surface of the second relay lens group 108-2 in the second state (d1≈d2), it is possible to use a common case.

Furthermore, by using a lamp having the same light converging angle, the aperture 102 and the collimeter lens 103 can be also arranged in the same way as those in FIG. 1.

Table 1 below shows an example of specific values of parameters in the condition formulas (1) to (6) explained above in the paraxial arrangement of the first embodiment. This example satisfies the condition formulas.

TABLE 1

| | PARAXIAL ARRANGEMENT | | | | |
|---|---|---|---|---|---|
| | 1/φ | 1/φ1 | e | 1/φ2 | fb |
| STATE 1 | 162.0 | 265.07 | 109.77 | 244.21 | 94.93 |
| STATE 2 | 162.0 | 482.1 | 105.29 | 190.71 | 126.62 | e1/e2 = 1.04,
Fbmax = 162 × 0.9 = 145.8,
Fbmin1 = 57.45,
Fbmin2 = 62.38

As shown in Table 1, the parameters in the first state (state 1) are set as below.

An inverse (1/Ø) of a refracting power Ø of the entire relay system is set to 162.0, an inverse (1/Ø11) of a refracting power of the first lens group 106-1 is set to 265.07, a paraxial inter-group distance e1 of the first lens group 106-1 and the second lens group 108-1 is set to 109.77, an inverse (1/Ø12) of a refracting power of the second lens group 108-1 is set to 244.21, and a paraxial back-focus fb1 of the relay lens system with respect to an infinite light flux is set to 94.93, respectively.

Similarly, parameters in the second state (state 2) are set as below.

An inverse (1/Ø) of a refracting power Ø of the entire relay system is set to 162.0, an inverse (1/Ø21) of a refracting power of the first lens group 106-2 is set to 482.1, a paraxial inter-group distance e2 of the first lens group 106-2 and the second lens group 108-2 is set to 105.29, an inverse (1/Ø22) of a refracting power of the second lens group 108-2 is set to 190.71, and a paraxial back-focus fb2 of the relay lens system with respect to an infinite light flux is set to 126.62, respectively.

In the projection type display apparatus 100 in the first embodiment, wherein the parameters are set as shown in Table 1, "e1/e2" is 1.04, which is in a range regulated by the condition formula (5), so that the condition is satisfied.

Also, the maximum value Fbmax of the back-focus fb is 145.8 (162×0.9), the minimum value Fbmin1 of the back-focus in the first state is 57.45 and the minimum value Fbmin2 of the back-focus in the second state is 62.38, which are in the range regulated by the condition formula (6), so that the condition is satisfied.

Figure 8A:
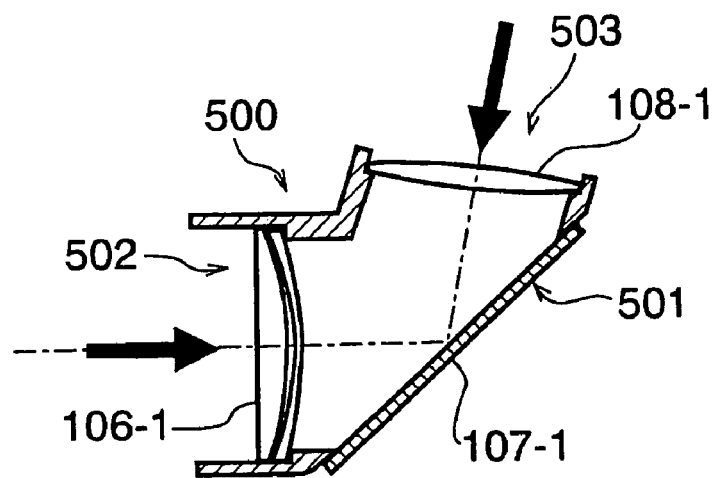
FIG. 8A and FIG. 8B are views of the configuration of a holding member of a relay lens system according to a first embodiment.
Figure 8B:
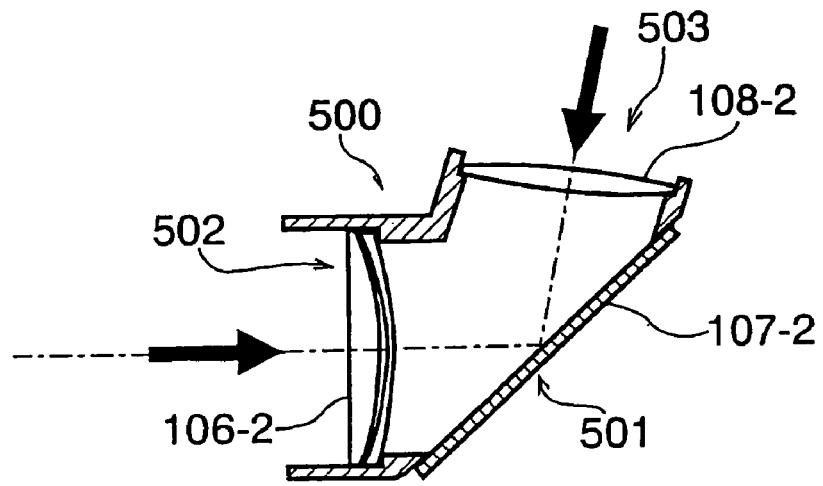

FIG. 8A and FIG. 8B are views of the configuration of a holding member of a relay lens system according to the first embodiment, wherein a section of the cylinder is shown. FIG. 8A corresponds to the first state and FIG. 8B corresponds to the second state.

As explained above, the holding member 500 is formed to be a cylindrical shape bent at a predetermined angle, wherein a bent portion 501 attached with the mirror 107 is cut at a predetermined angle.

It is configured that the mirror 107 is arranged between the first relay lens group 106 and the second relay lens group 108, and the first relay lens group 106 is installed from the fly-eye lens side and the second relay lens group 108 is installed from the TIR prism side, respectively.

Specifically, the first relay lens group 106 is installed in an opening 502 of one end side (fly-eye lens side) and the second relay lens group 108 is installed in an opening 503 on the other end side (TIR prism side) of the bent holding member 500.

Due to the configuration, in the projection type display apparatus 100 according to the first embodiment, a distance from a top of an emission surface of the first relay lens group 106 to a top of an incident surface of the second relay lens group 108 is in common, consequently, the relay lens can be installed by using a common case.

A slight error arises in the height from the lens holding surface to the top of the surface due to a difference of curvature, however, it can be corrected by a simple spacer. Alternately, it is also possible to design to omit the spacer in consideration of a height of the lens surface.

FIG. 9A and FIG. 9B are views of an optical path of a relay lens system in the first state and in the second state of the first embodiment.

As is known from the drawings, in the projection type display apparatus 100 of the first embodiment, a parallel light is focused on the image display devices 111-1 and 111-2.

Figure 10A:
FIG. 10A and FIG. 10B are views showing states of a light flux when a first fly-eye lens is arranged at a focal point of a second fly-eye lens.
Figure 10B:
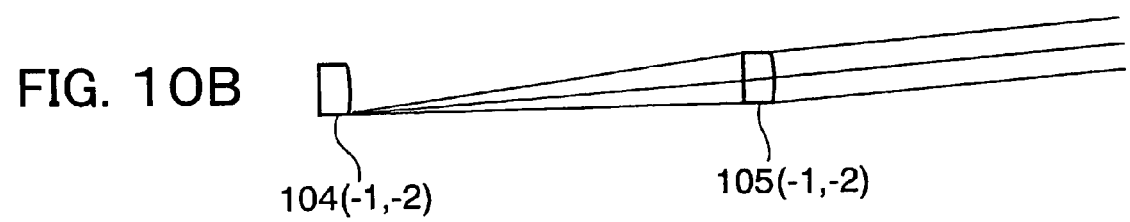

FIG. 10A and FIG. 10B are views showing a state of a light flux when the first fly-eye lens is arranged on a focal point of the second fly-eye lens.

As is known from the drawings, in the projection type display apparatus 100 of the first embodiment, the light flux emitted from the surface of the first fly-eye lens becomes parallel as a result that the first fly-eye lenses 104-1 and 104-2 are arranged on the focal points of the second fly-eye lenses 105-1 and 105-2.

Figure 11A:
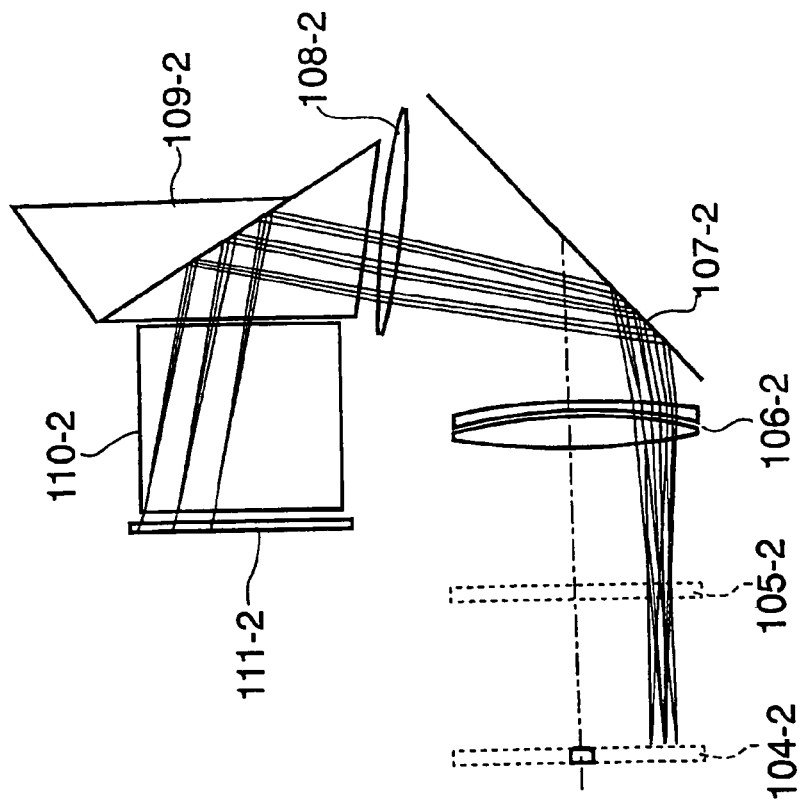
Figure 11B:
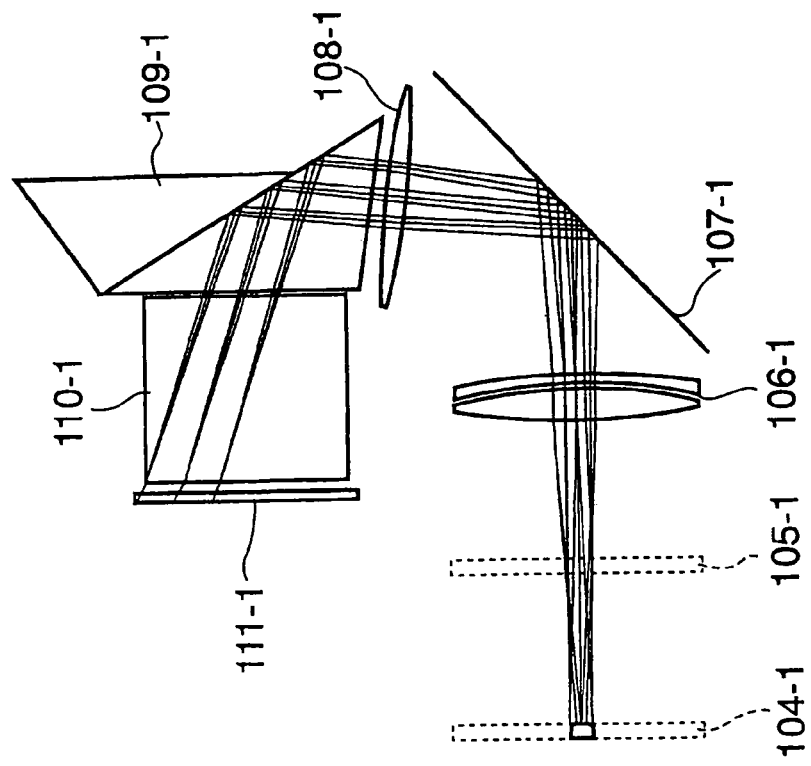

FIG. 11A and FIG. 11B are views, wherein FIG. 9A, FIG. 9B, FIG. 10A and FIG. 10B are put together, and a state that a surface of the first fly-eye lens is focused on the image display devices 111-1 and 111-2 by the second fly-eye lens and the relay lens is shown by focusing on the lens cell at the center and the peripheral lens cells.

Figure 12:
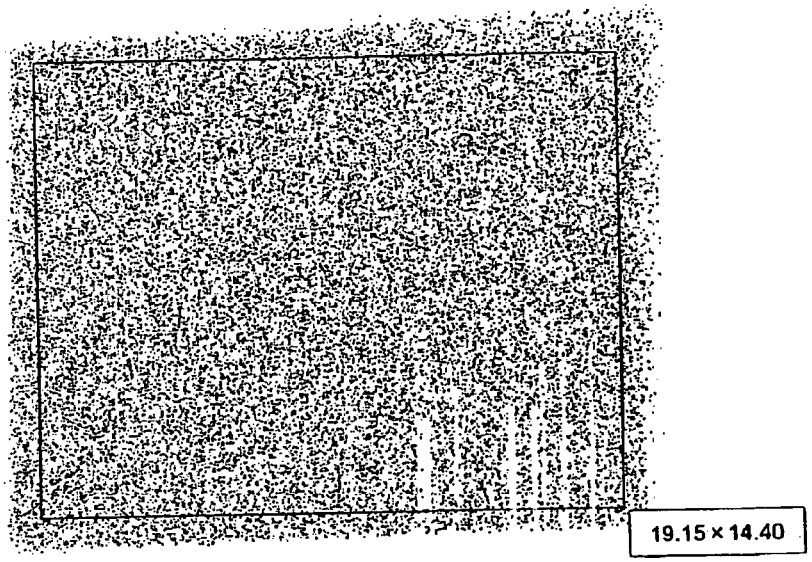
FIG. 12 is a view showing an illumination state of an image display device on an optical path in the first state according to the first embodiment.

FIG. 12 is a view of an illumination state of an image display device in an optical path in the first state of the first embodiment.

Figure 13:
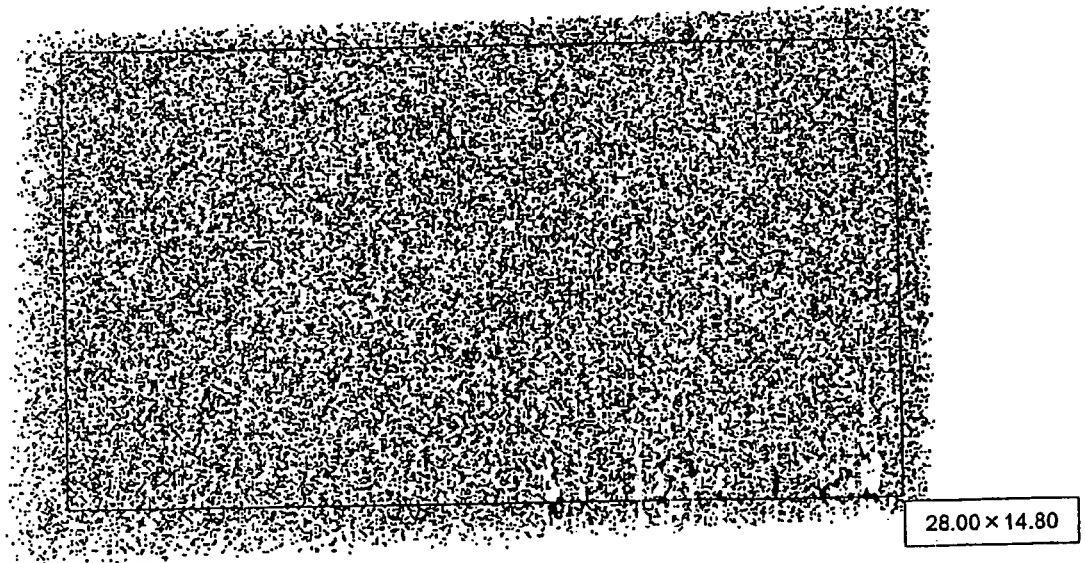
FIG. 13 is a view showing an illumination state of an image display device on an optical path in the second state according to the first embodiment.

FIG. 13 is a view of an illumination state of an image display device in an optical path in the second state of the first embodiment.

From FIG. 12 and FIG. 13, in the projection type display apparatus 100 of the first embodiment, it is known that image display devices having different sizes are accurately illuminated by using the common case.

Table 2 shows optical data in the first state in the first embodiment and Table 3 shows optical data in the second state in the same way.

As shown in Table 2 and Table 3, the projection type display apparatus 100 of the first embodiment accepts image display devices having different sizes as a result of having the same fly-eye lens arrangement and changing a size of the lens cell.

TABLE 2

| SURFACE | R | INTERVAL | REFRACTION INDEX | DISPERSION | INCLINATION | EFFECTIVE DIAMETER | |
|---|---|---|---|---|---|---|---|
| 1 | ∞ | 83.60 | | | | 10.0 × 18.2 | |
| 2 | 135.34 | 2.00 | 1.60311 | 60.7 | | φ70 | |
| 3 | 85.61 | 5.80 | | | | φ70 | |
| 4 | 205.25 | 15.00 | 1.63854 | 55.4 | | φ70 | |
| 5 | −68.49 | 30.00 | | | | φ70 | |
| 6 | ∞ | 3.50 | 1.472 | 65.65 | | 70.5 × 68.2 | |
| 7 | −23.3 | 46.0 | | | | 4.7 × 6.2 | FLY-EYE CELL SIZE |
| 8 | ∞ | 3.50 | 1.472 | 65.65 | | 70.5 × 68.2 | |
| 9 | −23.3 | 40.00 | | | | 4.7 × 6.2 | FLY-EYE CELL SIZE |
| 10 | 200.00 | 10.00 | 1.51633 | 64.1 | | φ70 | |
| 11 | −137.40 | 2.00 | | | | φ70 | |
| 12 | −120.00 | 2.00 | 1.80518 | 25.4 | | φ70 | |
| 13 | −195.00 | 51.00 | | | | φ70 | |
| 14 | ∞ | 49.00 | REFLECTION SURFACE | | 48.625 | | |
| 15 | 252.00 | 6.00 | 1.51633 | 64.1 | | φ70 | |
| 16 | −252.00 | 4.00 | | | | φ70 | |
| 17 | ∞ | 27.84 | 1.51633 | 64.1 | | | |
| 18 | ∞ | 35.46 | REFLECTION SURFACE | | 49.75 | | |
| 19 | ∞ | 1.00 | | | 16.75 | | |
| 20 | ∞ | 57.00 | 1.51633 | 64.1 | | | |
| 21 | ∞ | 4.00 | | | | | |
| 22 | ∞ | 3.00 | 1.51633 | 64.1 | | | |
| 23 | ∞ | 0.50 | | | | 19.15 × 14.36 | IMAGE DISPLAY DEVICE |

TABLE 3

| SURFACE | R | INTERVAL | REFRACTION INDEX | DISPERSION | INCLINATION | EFFECTIVE DIAMETER | |
|---|---|---|---|---|---|---|---|
| 1 | ∞ | 83.60 | | | | 10.0 × 18.2 | |
| 2 | 135.34 | 2.00 | 1.60311 | 60.7 | | φ70 | |
| 3 | 85.61 | 5.80 | | | | φ70 | |
| 4 | 205.25 | 15.00 | 1.63854 | 55.4 | | φ70 | |
| 5 | −68.49 | 30.00 | | | | φ70 | |
| 6 | ∞ | 3.50 | 1.472 | 65.65 | | 72 × 71.2 | |
| 7 | −23.3 | 46.0 | | | | 4.8 × 8.9 | FLY-EYE SURFACE |
| 8 | ∞ | 3.50 | 1.472 | 65.65 | | 72 × 71.2 | |
| 9 | −23.3 | 40.00 | | | | 4.8 × 8.9 | FLY-EYE SURFACE |
| 10 | ∞ | 10.00 | 1.51633 | 64.1 | | φ70 | |
| 11 | −99.12 | 2.00 | | | | φ70 | |
| 12 | −88.00 | 2.00 | 1.80518 | 25.4 | | φ70 | |
| 13 | −135.00 | 51.00 | | | | φ70 | |
| 14 | ∞ | 49.00 | REFLECTION SURFACE | | 48.625 | | |
| 15 | 174.60 | 8.00 | 1.51633 | 64.1 | | φ70 | |
| 16 | −224.00 | 6.30 | | | | φ70 | |
| 17 | ∞ | 35.2 | 1.51633 | 64.1 | | | |
| 18 | ∞ | 46.2 | REFLECTION SURFACE | | 49.75 | | |
| 19 | ∞ | 1.00 | | | 16.75 | | |
| 20 | ∞ | 82.50 | 1.51633 | 64.1 | | | |
| 21 | ∞ | 4.00 | | | | | |
| 22 | ∞ | 3.00 | 1.51633 | 64.1 | | | |
| 23 | ∞ | 0.50 | | | | 28.02 × 14.77 | IMAGE DISPLAY DEVICE |

Second Embodiment

Figures 14A, 14B:
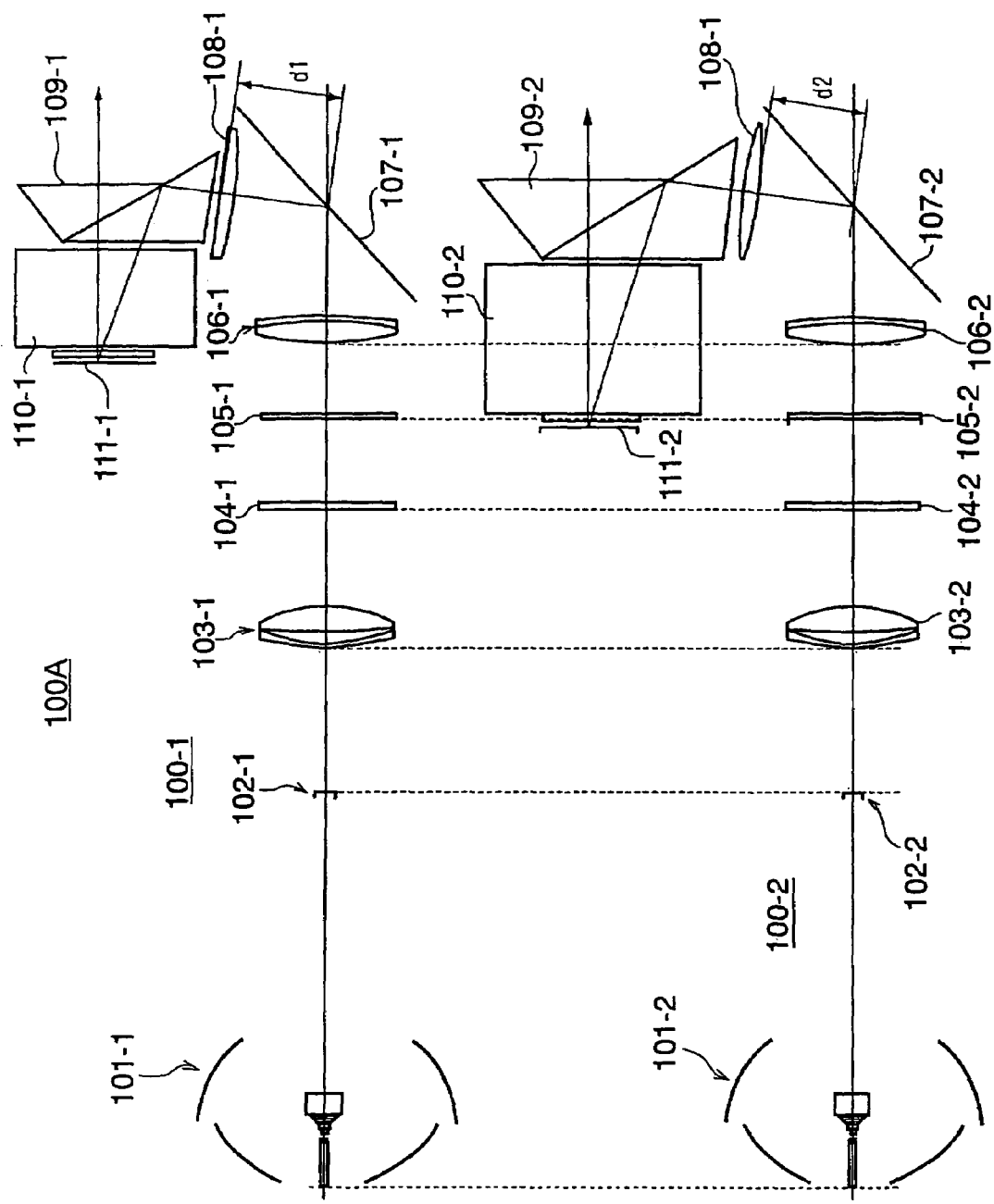
FIG. 14A and FIG. 14B are views of an optical system showing the configuration in a first state and that in a second state of a projection type display apparatus according to a second embodiment of the present invention.

FIG. 14A and FIG. 14B are views of an optical system showing the configuration in a first state and that in a second state of a projection type display apparatus according to a second embodiment of the present invention; wherein FIG. 14A shows the configuration in the first state, and FIG. 14B shows the configuration in the second state, respectively.

The projection type display apparatus 100A of the second embodiment basically has the same configuration as that of the projection type display apparatus 100 in the first embodiment.

A point that the projection type display apparatus 100A of the second embodiment is different from that of the first embodiment is a focal length of the relay lens and a distance between lens groups. The second embodiment show that the case can be used in common when the condition formulas (1) to (6) explained above is satisfied.

Table 4 below shows an example of specific values of parameters in the condition formulas (1) to (6) of a paraxial arrangement of the second embodiment. This example satisfies the condition formulas.

TABLE 4

| | $1/\phi$ | $1/\phi_1$ | e | $1/\phi_2$ | fb |
|---|---|---|---|---|---|
| STATE 1 | 200.0 | 234.23 | 117.67 | 682.40 | 93.0 |
| STATE 2 | 200.0 | 342.47 | 120.58 | 311.37 | 126.6 | e1/e2 = 0.976
Fbmax = 200 × 0.9 = 180
Fbmin1 = 90.56,
Fbmin2 = 87.36

As shown in Table 4, the parameters in the first state (state 1) are set as below.

An inverse (1/Ø) of a refracting power Ø of the entire relay system is set to 200.0, an inverse (1/Ø11) of a refracting power of the first lens group 106-1 is set to 234.23, a paraxial inter-group distance e1 of the first lens group 106-1 and the second lens group 108-1 is set to 117.67, an inverse (1/Ø12) of a refracting power of the second lens group 108-1 is set to 682.40, and a paraxial back-focus fb1 of the relay lens system with respect to an infinite light flux is set to 93.00, respectively.

Similarly, parameters in the second state (state 2) are set as below.

An inverse (1/Ø) of a refracting power Ø of the entire relay system is set to 200.0, an inverse (1/Ø21) of a refracting power of the first lens group 106-2 is set to 342.47, a paraxial inter-group distance e2 of the first lens group 106-2 and the second lens group 108-2 is set to 120.58, an inverse (1/Ø22) of a refracting power of the second lens group 108-2 is set to 311.37, and a paraxial back-focus fb2 of the relay lens system with respect to an infinite light flux is set to 126.6, respectively.

In the projection type display apparatus 100A in the second embodiment, wherein the parameters are set as in Table 4, "e1/e2" is 0.976, which is in a range regulated by the condition formula (5), so that the condition is satisfied.

Also, the maximum value Fbmax of the back-focus fb is 180 (200×0.9), the minimum value Fbmin1 of the back-focus in the first state is 90.56 and the minimum value Fbmin2 of the back-focus in the second state is 87.36, which are in the range regulated by the condition formula (6), so that the condition is satisfied.

Table 5 shows optical data in the first state of the second embodiment, and Table 6 shows optical data in the second state in, the same way.

As shown in Table 5 and Table 6, the projection type display apparatus 100A of the second embodiment accepts image display devices having different sizes as a result of having the same fly-eye lens arrangement and changing a size of the lens cell.

TABLE 5

| SURFACE | R | INTERVAL | REFRACTION INDEX | DISPERSION | INCLINATION | EFFECTIVE DIAMETER |
|---|---|---|---|---|---|---|
| 1 | ∞ | 83.60 | | | | 10.0 × 18.2 |
| 2 | 135.34 | 2.00 | 1.60311 | 60.7 | | φ70 |
| 3 | 85.61 | 5.80 | | | | φ70 |
| 4 | 205.25 | 15.00 | 1.63854 | 55.4 | | φ70 |
| 5 | −68.49 | 30.00 | | | | φ70 |
| 6 | ∞ | 3.50 | 1.472 | 65.65 | | 68.4 × 70.0 |
| 7 | −23.3 | 46.0 | | | | 3.8 × 5.0 |
| 8 | ∞ | 3.50 | 1.472 | 65.65 | | 68.4 × 70.0 |
| 9 | −23.3 | 40.00 | | | | 3.8 × 5.0 |
| 10 | 141.50 | 12.40 | 1.51633 | 64.1 | | φ74 |
| 11 | −152.00 | 0.80 | | | | φ74 |
| 12 | −139.20 | 2.50 | 1.80518 | 25.4 | | φ74 |
| 13 | −267.00 | 61.00 | | | | φ74 |
| 14 | ∞ | 49.00 | REFLECTION SURFACE | | 48.625 | |
| 15 | 290.00 | 7.40 | 1.51633 | 64.1 | | φ62 |
| 16 | 1600.00 | 4.00 | | | | φ62 |
| 17 | ∞ | 27.84 | 1.51633 | 64.1 | | |
| 18 | ∞ | 35.46 | REFLECTION SURFACE | | 49.75 | |
| 19 | ∞ | 1.00 | | | 16.75 | |
| 20 | ∞ | 57.00 | 1.51633 | 64.1 | | |
| 21 | ∞ | 4.00 | | | | |
| 22 | ∞ | 3.00 | 1.51633 | 64.1 | | |
| 23 | ∞ | 0.50 | | | | 19.15 × 14.36 |

TABLE 6

| SURFACE | R | INTERVAL | REFRACTION INDEX | DISPERSION | INCLINATION | EFFECTIVE DIAMETER |
|---|---|---|---|---|---|---|
| 1 | ∞ | 83.60 | | | | 10.0 × 18.2 |
| 2 | 135.34 | 2.00 | 1.60311 | 60.7 | | φ70 |
| 3 | 85.61 | 5.80 | | | | φ70 |
| 4 | 205.25 | 15.00 | 1.63854 | 55.4 | | φ70 |
| 5 | −68.49 | 30.00 | | | | φ70 |
| 6 | ∞ | 3.50 | 1.472 | 65.65 | | 71 × 70.2 |
| 7 | −23.3 | 46.0 | | | | 7.1 × 3.9 |
| 8 | ∞ | 3.50 | 1.472 | 65.65 | | 71 × 70.2 |
| 9 | −23.3 | 40.00 | | | | 7.1 × 3.9 |
| 10 | 215.00 | 12.40 | 1.51633 | 64.1 | | φ70 |
| 11 | −164.60 | 0.80 | | | | φ70 |
| 12 | −147.70 | 2.50 | 1.80518 | 25.4 | | φ70 |
| 13 | −284.00 | 61.00 | | | | φ70 |
| 14 | ∞ | 49.00 | REFLECTION SURFACE | | 48.625 | |
| 15 | 300.00 | 7.40 | 1.51633 | 64.1 | | φ70 |
| 16 | −346.00 | 6.30 | | | | φ70 |
| 17 | ∞ | 35.2 | 1.51633 | 64.1 | | |
| 18 | ∞ | 46.2 | REFLECTION SURFACE | | 49.75 | |
| 19 | ∞ | 1.00 | | | 16.75 | |
| 20 | ∞ | 82.50 | 1.51633 | 64.1 | | |
| 21 | ∞ | 4.00 | | | | |
| 22 | ∞ | 3.00 | 1.51633 | 64.1 | | |
| 23 | ∞ | 0.50 | | | | 28.02 × 14.77 |

Figure 15:
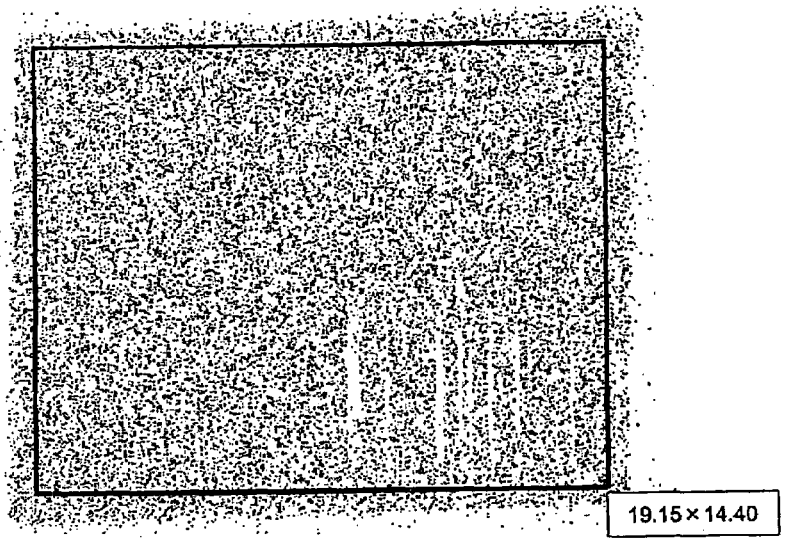
FIG. 15 is a view showing an illumination state of an image display device on an optical path in the first state according to the second embodiment.

FIG. 15 is a view of an illumination state of an image display device in an optical path in the first state of the second embodiment.

Figure 16:
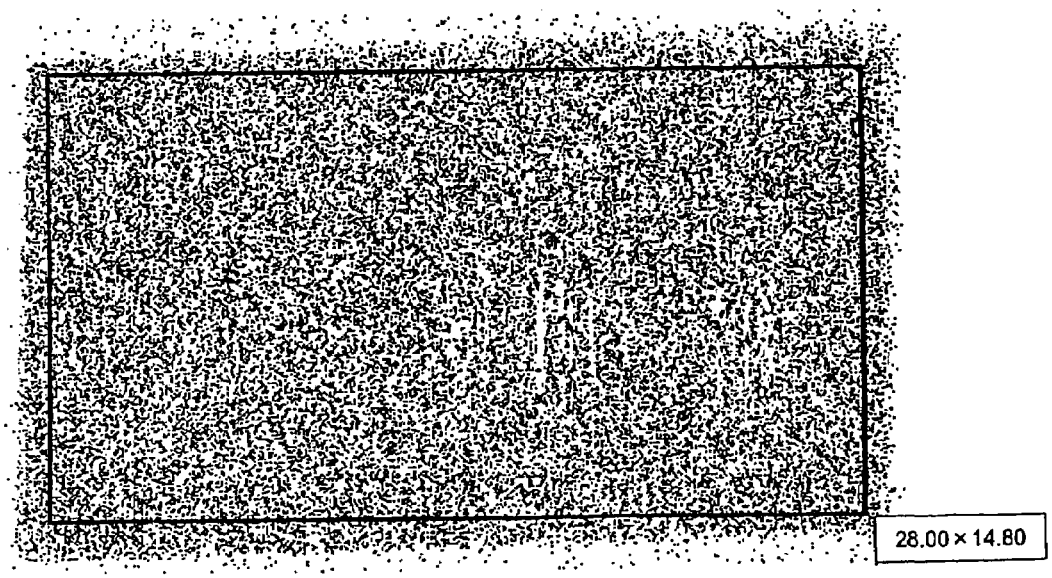
FIG. 16 is a view showing an illumination state of an image display device on an optical path in the second state according to the second embodiment.

FIG. 16 is a view of an illumination state of an image display device in an optical path in the second state of the second embodiment.

From FIG. 15 and FIG. 16, it is known that ranges of image display devices having different sizes are illuminated evenly (accurately by using a same case) in the projection type display apparatus 100A of the second embodiment.

Third Embodiment

Figures 17A, 17B:
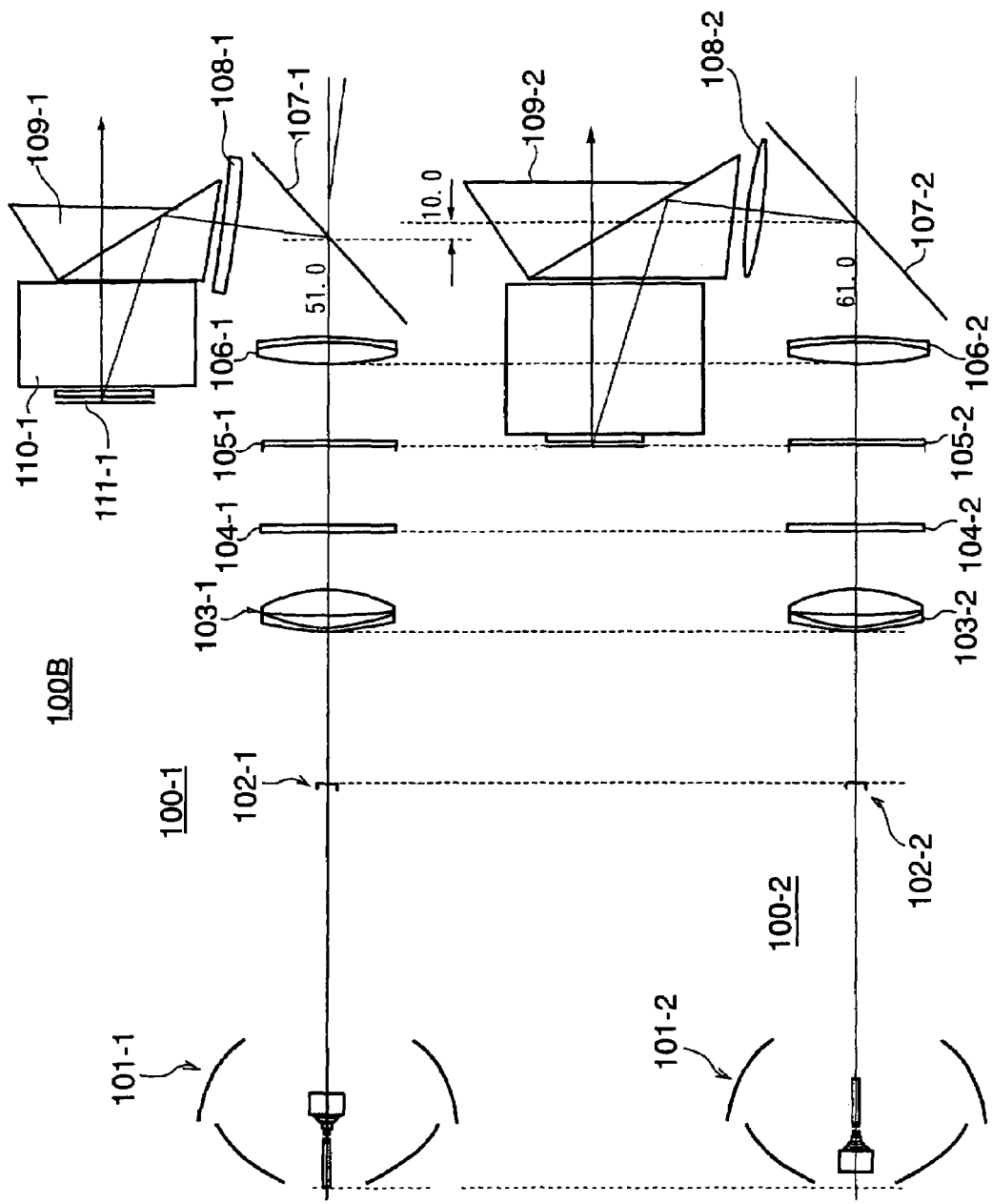
FIG. 17A and FIG. 17B are views of an optical system showing the configuration in a first state and that in a second state of a projection type display apparatus according to a third embodiment of the present invention.

FIG. 17A and FIG. 17B are views of an optical system showing the configuration in a first state and that in a second state of a projection type display apparatus according to a third embodiment of the present invention; wherein FIG. 17A shows the configuration in the first state and FIG. 17B shows the configuration in the second state, respectively.

The projection type display apparatus 100B of the third embodiment basically has the same configuration as those of the projection type display apparatuses 100 and 100A in the first embodiment and the second embodiment.

A point that the projection type display apparatus 100B of the third embodiment is different from those in the first and second embodiments is that the condition formula (5) as explained above is not satisfied and a common case cannot be used, and it is a comparative example of the first and second embodiments.

Table 7 below shows an example of specific values of parameters in the condition formulas (1) to (6) of a paraxial arrangement of the third embodiment. This is an example of not satisfying the condition formulas.

TABLE 7

|  | $1/\phi$ | $1/\phi1$ | e | $1/\phi2$ | fb |
|---|---|---|---|---|---|
| STATE 1 | 200.0 | 215.17 | 103.18 | 1469.93 | 93.0 |
| STATE 2 | 200.0 | 342.47 | 120.58 | 311.37 | 126.6 | e1/e2 = 0.856 < 0.95
f × 0.9 = 180.0
1.1 × (1 − e1 × φ1)/φ1 = 106.5 > fb93    X LOWER LIMIT VALUE
1.1 × (1 − e2 × φ2)/φ2 = 87.36 < fb126.62   ○

As shown in Table 7, parameters in the first state (state 1) are set as below.

An inverse ($1/\varnothing$) of a refracting power $\varnothing$ of the entire relay system is set to 200.0, an inverse ($1/\varnothing11$) of a refracting power of the first lens group 106-1 is set to 215.17, a paraxial inter-group distance e1 of the first lens group 106-1 and the second lens group 108-1 is set to 103.18, an inverse ($1/\varnothing12$) of a refracting power of the second lens group 108-1 is set to 1469.93, and a paraxial back-focus fb1 of the relay lens system with respect to an infinite light flux is set to 93.00, respectively.

Similarly, parameters in the second state (state 2) are set as below.

An inverse ($1/\varnothing$) of a refracting power $\varnothing$ of the entire relay system is set to 200.0, an inverse ($1/\varnothing21$) of a refracting power of the first lens group 106-2 is set to 342.47, a paraxial inter-group distance e2 of the first lens group 106-2 and the second lens group 108-2 is set to 120.58, an inverse ($1/\varnothing22$) of a refracting power of the second lens group 108-2 is set to 311.37, and a paraxial back-focus fb2 of the relay lens system with respect to an infinite light flux is set to 126.6, respectively.

In the projection type display apparatus 100B in the third embodiment, wherein the parameters are set as shown in Table 7, "e1/e2" is 0.856, which is smaller than the lower limit value regulated by the condition formula (5), so that the condition formula (5) is not satisfied.

Also, the maximum value Fbmax of the back-focus fb is 180 (200×0.9), the minimum value Fbmin1 of the back-focus in the first state is 106.5 and the minimum value Fbmin2 of the back-focus in the second state is 87.36, which do not satisfy the range regulated by the condition formula (6).

Table 8 shows optical data in the first state of the third embodiment, and Table 9 shows optical data in the second state in the same way.

TABLE 8

| SURFACE | R | INTERVAL | REFRACTION INDEX | DISPERSION | INCLINATION | EFFECTIVE DIAMETER |
|---|---|---|---|---|---|---|
| 1 | ∞ | 83.60 |  |  |  | 10.0 × 18.2 |
| 2 | 135.34 | 2.00 | 1.60311 | 60.7 |  | φ70 |
| 3 | 85.61 | 5.80 |  |  |  | φ70 |
| 4 | 205.25 | 15.00 | 1.63854 | 55.4 |  | φ70 |
| 5 | −68.49 | 30.00 |  |  |  | φ70 |
| 6 | ∞ | 3.50 | 1.472 | 65.65 |  | 68.4 × 70.0 |
| 7 | −23.3 | 46.0 |  |  |  | 3.8 × 5.0 |
| 8 | ∞ | 3.50 | 1.472 | 65.65 |  | 68.4 × 70.0 |
| 9 | −23.3 | 40.00 |  |  |  | 3.8 × 5.0 |
| 10 | 131.30 | 12.40 | 1.51633 | 64.1 |  | φ74 |
| 11 | −144.80 | 0.80 |  |  |  | φ74 |
| 12 | −132.30 | 2.50 | 1.80518 | 25.4 |  | φ74 |
| 13 | −248.00 | 51.00 |  |  |  | φ74 |
| 14 | ∞ | 49.00 | REFLECTION SURFACE |  | 48.625 |  |
| 15 | 360.00 | 7.40 | 1.51633 | 64.1 |  | φ62 |
| 16 | 678.00 | 4.00 |  |  |  | φ62 |
| 17 | ∞ | 27.84 | 1.51633 | 64.1 |  |  |
| 18 | ∞ | 35.46 | REFLECTION SURFACE |  | 49.75 |  |
| 19 | ∞ | 1.00 |  |  | 16.75 |  |
| 20 | ∞ | 57.00 | 1.51633 | 64.1 |  |  |
| 21 | ∞ | 4.00 |  |  |  |  |
| 22 | ∞ | 3.00 | 1.51633 | 64.1 |  |  |
| 23 | ∞ | 0.50 |  |  |  | 19.15 × 14.36 |

TABLE 9

| SURFACE | R | INTERVAL | REFRACTION INDEX | DISPERSION | INCLINATION | EFFECTIVE DIAMETER |
|---|---|---|---|---|---|---|
| 1 | ∞ | 83.60 |  |  |  | 10.0 × 18.2 |
| 2 | 135.34 | 2.00 | 1.60311 | 60.7 |  | φ70 |
| 3 | 85.61 | 5.80 |  |  |  | φ70 |
| 4 | 205.25 | 15.00 | 1.63854 | 55.4 |  | φ70 |

TABLE 9-continued

| SURFACE | R | INTERVAL | REFRACTION INDEX | DISPERSION | INCLINATION | EFFECTIVE DIAMETER |
|---|---|---|---|---|---|---|
| 5 | −68.49 | 30.00 | | | | φ70 |
| 6 | ∞ | 3.50 | 1.472 | 65.65 | | 71 × 70.2 |
| 7 | −23.3 | 46.0 | | | | 7.1 × 3.9 |
| 8 | ∞ | 3.50 | 1.472 | 65.65 | | 71 × 70.2 |
| 9 | −23.3 | 40.00 | | | | 7.1 × 3.9 |
| 10 | 215.00 | 12.40 | 1.51633 | 64.1 | | φ70 |
| 11 | −164.60 | 0.80 | | | | φ70 |
| 12 | −147.70 | 2.50 | 1.80518 | 25.4 | | φ70 |
| 13 | −284.00 | 61.00 | | | | φ70 |
| 14 | ∞ | 49.00 | REFLECTION SURFACE | | 48.625 | |
| 15 | 300.00 | 7.40 | 1.51633 | 64.1 | | φ70 |
| 16 | −346.00 | 6.30 | | | | φ70 |
| 17 | ∞ | 35.2 | 1.51633 | 64.1 | | |
| 18 | ∞ | 46.2 | REFLECTION SURFACE | | 49.75 | |
| 19 | ∞ | 1.00 | | | 16.75 | |
| 20 | ∞ | 82.50 | 1.51633 | 64.1 | | |
| 21 | ∞ | 4.00 | | | | |
| 22 | ∞ | 3.00 | 1.51633 | 64.1 | | |
| 23 | ∞ | 0.50 | | | | 28.02 × 14.77 |

As explained above, the projection type display apparatus 100B of the third embodiment is an example of being in short of the lower limit value of the condition formula (5), and it is known that an interval between the first lens group 106 and the second lens group 108 is changed by 10 mm. In this case, a common case cannot be used.

Fourth Embodiment

As a fourth embodiment, a change of a value in the condition formula (6) when designing the relay lens system by keeping an interval between lens tops to be constant and changing the back-focus will be examined.

Figures 18A, 18B, 18C:
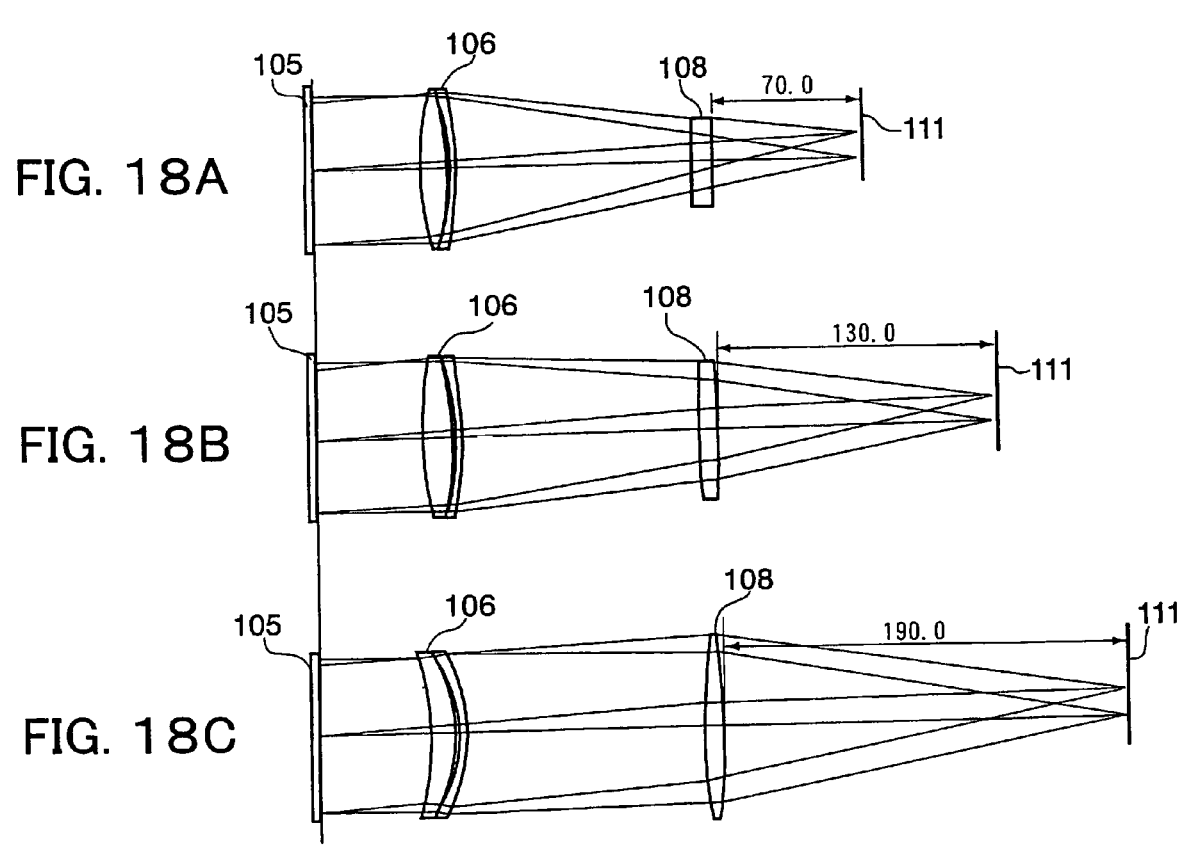
FIG. 18A to FIG. 18C are views of optical paths when changing a back-focus while maintaining a constant arrangement with a focal length of 200 mm.

FIG. 18A to FIG. 18C are views of an optical path when changing a back focus while keeping an arrangement constant at a focal length of 200 mm. In FIG. 18A to FIG. 18C, bending by a mirror is omitted and a prism optical path is illustrated in terms of air.

In this case, as shown in FIG. 18A, when the back-focus is made shorter with respect to the focal length, a refracting power of the second lens group 108 becomes weak and the refracting power leans to the first lens group 106. Since a refracting power gathers to the first lens group 106 being close to a stop, field curvature arises and rectangular boundary lines of an illumination area defocuses, which is not preferable.

Inversely, as shown in FIG. 18C, when the back-focus becomes close to the focal length, a refracting power gathers to the second lens group 108. In this case, since a refracting power of the first lens group 106 being close to the stop is weak, a spherical aberration arises, the illumination area boundary lines blur as a whole and the width becomes wide, which is not preferable. It is because a wider illumination area becomes necessary to secure an effective area in the case where the blur spreads wide comparing with that in the case where the boundary lines are sharp.

From above reason, it is known that the condition formula (6) has to be satisfied.

The power arrangements in FIG. 18A to FIG. 18C are shown in Table 10. Values of a back-focus condition formula are also shown.

In Table 10, "a" corresponds to FIG. 18A, "b" corresponds to FIG. 18B, and "c" corresponds to FIG. 18C.

As shown in Table 10, "a" and "c" do not satisfy the condition formula.

TABLE 10

| | f | Fb | 1/φ1 | 1/φ2 | e | e1/e2 | (1 − φe)/φ × 1.1 | f × 0.9 |
|---|---|---|---|---|---|---|---|---|
| a | 200.0 | 70 | 193.14 | −2427.83 | 109.705 | 0.93 | 99.32 | 180 |
| b | 200.0 | 130 | 362.18 | 297.75 | 117.89 | STANDARD | 90.32 | 180 |
| C | 200.0 | 190 | 1572.33 | 223.65 | 38.42 | 0.325 | 177.74 | 180 |

Table 11 shows optical data of the configuration in FIG. 18A. Table 12 shows optical data of the configuration in FIG. 18B and Table 13 shows optical data of the configuration in FIG. 18C in the same way.

TABLE 11

| SURFACE | R | INTERVAL | REFRACTION INDEX | DISPERSION | EFFECTIVE DIAMETER |
|---|---|---|---|---|---|
| STOP | | 40.0 | | | φ68 |
| 1 | 120.1237 | 12.40 | 1.51633 | 64.1 | φ70 |
| 2 | −134.6766 | 0.80 | | | φ70 |
| 3 | −122.3330 | 2.50 | 1.80518 | 25.4 | φ70 |
| 4 | −220.8936 | 110.00 | | | φ70 |
| 5 | −537.1323 | 10.0 | 1.51633 | 64.1 | φ70 |
| 6 | −943.4605 | 70.0 | | | φ70 |

TABLE 12

| SURFACE | R | INTERVAL | REFRACTION INDEX | DISPERSION | EFFECTIVE DIAMETER |
|---|---|---|---|---|---|
| STOP |  | 40.0 |  |  | φ68 |
| 1 | 261.2074 | 12.40 | 1.51633 | 64.1 | φ70 |
| 2 | −152.7759 | 0.80 |  |  | φ70 |
| 3 | −135.5705 | 2.50 | 1.80518 | 25.4 | φ70 |
| 4 | −240.6086 | 110.00 |  |  | φ70 |
| 5 | 351.7050 | 10.0 | 1.51633 | 64.1 | φ70 |
| 6 | −271.7973 | 130.0 |  |  | φ70 |

TABLE 13

| SURFACE | R | INTERVAL | REFRACTION INDEX | DISPERSION | EFFECTIVE DIAMETER |
|---|---|---|---|---|---|
| STOP |  | 40.0 |  |  | φ68 |
| 1 | −115.4936 | 12.40 | 1.51633 | 64.1 | φ70 |
| 2 | −66.48371 | 0.80 |  |  | φ70 |
| 3 | −62.76241 | 2.50 | 1.80518 | 25.4 | φ70 |
| 4 | −81.62645 | 110.00 |  |  | φ70 |
| 5 | 195.5611 | 10.0 | 1.51633 | 64.1 | φ70 |
| 6 | −279.3299 | 190.00 |  |  | φ70 |

Figures 19A, 19B:
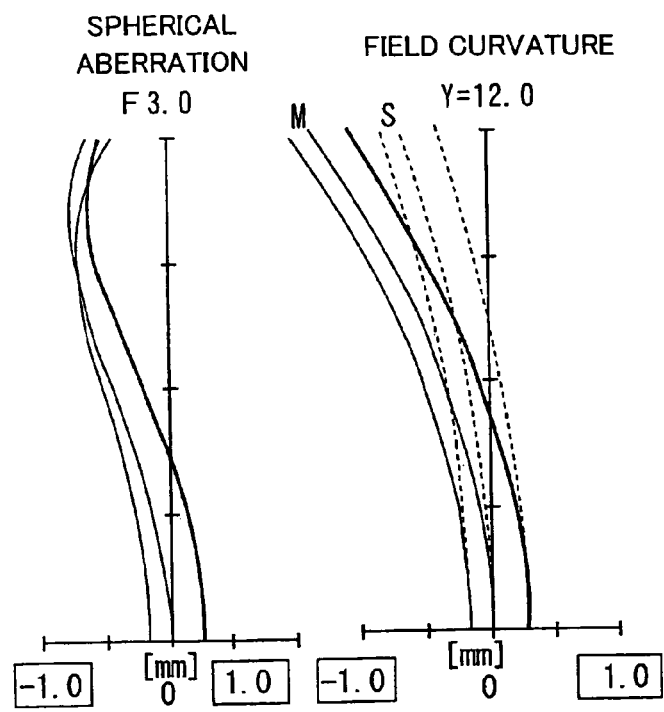
FIG. 19A and FIG. 19B are views of an aberration of a relay lens system corresponding to the configuration in FIG. 18A.

FIG. 19A and FIG. 19B are views of an aberration of a relay lens system corresponding to the configuration in FIG. 18A, wherein FIG. 19A shows the spherical aberration, and FIG. 19B shows field curvature.

Figures 20A, 20B:
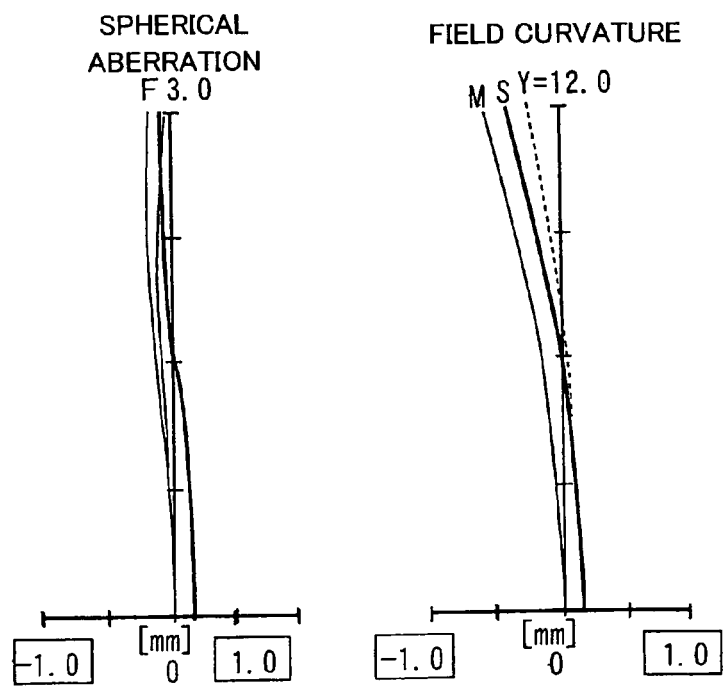
FIG. 20A and FIG. 20B are views of an aberration of a relay lens system corresponding to the configuration in FIG. 18B.

FIG. 20A and FIG. 20B are views of an aberration of a relay lens system corresponding to the configuration in FIG. 18B, wherein FIG. 20A shows the spherical aberration, and FIG. 20B shows field curvature.

Figure 21A:
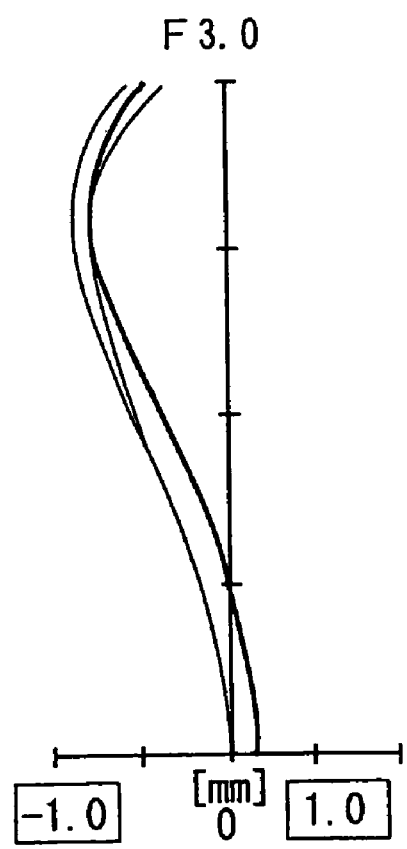
FIG. 21A and FIG. 21B are views of an aberration of a relay lens system corresponding to the configuration in FIG. 18C.
Figure 21B:
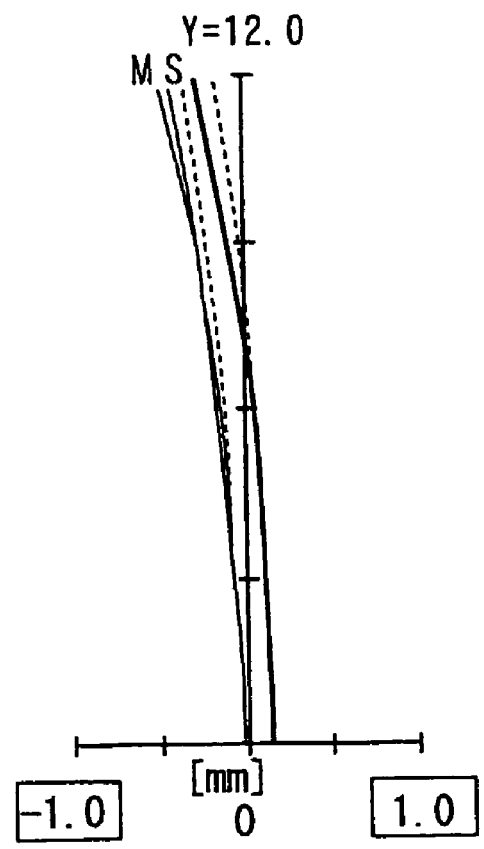

FIG. 21A and FIG. 21B are views of an aberration of a relay lens system corresponding to the configuration in FIG. 18C, wherein FIG. 21A shows the spherical aberration, and FIG. 21B shows field curvature.

In the aberration views in FIG. 19 to FIG. 21, a position of the surface of the second fly-eye lens is set at an aperture stop and evaluated as an aberration corresponding to an infinite light flux. This corresponds to an evaluation of focusing performance on the first fly-eye lens surface when the first fly-eye lens 105 is arranged at a focal point on the light source side of the second fly-eye lens 106.

In the configuration in FIG. 18A and FIG. 18C, wherein the condition formula (6) is not satisfied, an aberration arises much.

Also from this view point, it is known that the condition formula (6) has to be satisfied.

As explained above, according to the present embodiment, the first lens holding member 300 for holding the first fly-eye lens 104, the second lens holding member 400 joined to the first lens holding member 300 and for holding the second fly-eye lens 105, the third lens holding member 500 joined to the second lens holding member 400 and for holding the first lens group 106, the mirror 107 and the second lens group 108 are provided; and the first lens holding member 300 and the second lens holding member 400 are joined to be rotatable about an optical axis; so that respective focal lengths, etc. and other conditions are satisfied, a mutual arrangement is always kept to be constant, a molding error and installation error of the fly-eye lenses are absorbed, deviation of an image on boundary lines of the fly-eye lenses from a designed position can be prevented, and unevenness of brightness can be suppressed.

Also, as a result that the image display device 111 (-1 and -2), an illumination optical system for irradiating an illumination light from a light source to the image display device, and a projection optical system for projecting an image formed by the image display device are provided; the illumination optical system includes the first fly-eye lens 104 (-1 and -2) and the second fly-eye lens 105 (-1 and -2) arranged at each other's focal points, and the first lens group 106 (-1 and -2) and the second lens group 108 (-1 and -2) arranged over the mirror 107 (-1 and -2) for bending an optical path; and the first and second lens groups have a same focal length but different back-focus; and the condition formulas (1) to (6) are satisfied; it is possible to install lenses in a common case even when a size of the image display device and an optical path length of the prism are changed, and the development costs and the product cost can be reduced.

It should be understood by those skilled in the art that various modifications, combinations, sub-combinations and alternations may occur depending on design requirements and other factors insofar as they are within the scope of the appended claims or the equivalents thereof.

What is claimed is:

1. An illumination optical apparatus comprising: a first fly-eye lens having a plurality of lens cells arranged along two directions orthogonal to each other and to an optical axis;
a second fly-eye lens having a plurality of lens cells arranged along two directions orthogonal to each other and to said optical axis;
a first lens holding member holding said first fly-eye lens;
a second lens holding member joined to said first lens holding member, and holding said second fly-eye lens; and
a third lens holding member joined to said second lens holding member, and holding an optical lens;
wherein an illumination area is formed as a result of each shape of a lens cell aperture of said first fly-eye lens being projected by said second fly-eye lens and said optical lens to be enlarged, and
said first lens holding member and said second lens holding member are joined to be relatively rotatable about said optical axis.

2. An illumination optical apparatus comprising: a first fly-eye lens having a plurality of lens cells arranged alone two directions orthogonal to each other and to an optical axis;
a second fly-eye lens having a plurality of lens cells arranged along two directions orthogonal to each other and to said optical axis;
a first lens holding member holding said first fly-eye lens;
a second lens holding member joined to said first lens holding member, and holding said second fly-eye lens;
a third lens holding member joined to said second lens holding member, and holding an optical lens;
a first engaging member provided in a portion of said second lens holding member, where the portion faces to said first lens holding member and is aparted from an optical axis by a predetermined distance;
a second engaging member provided in a portion of said second lens holding member, where the portion faces to said third lens holding member and is aparted from an optical axis by a predetermined distance;
a first engaged portion to be engaged with said first engaging member, provided in a portion of said first lens holding member, where the portion faces to said second lens holding member; and
a second engaged portion to be engaged with said second engaging member, provided in a portion of said first lens holding member, where the portion faces to said second lens holding member, wherein an illumination area is formed as a result of each shape of a lens cell aperture of said first fly-eye lens being projected by said second fly-eye lens and said optical lens to be enlarged.

3. An illumination optical apparatus as set forth in claim 2, wherein:
   said first engaging member and said first engaged portion can be engaged to be rotatable about said optical axis in a predetermined range;
   said second engaging member and said second engaged portion to be engaged can be engaged to be rotatable about said optical axis in a predetermined range;
   a first fixing portion capable of fixing said first lens holding member and said second lens holding member when said first engaging member and said first engaged portion are in an engaged state is provided; and
   a second fixing portion capable of fixing said second lens holding member and said third lens holding member when said second engaging member and said second engaged portion to be engaged are in an engaged state is provided.

4. An illumination optical apparatus as set forth in claim 1, wherein:
   said third lens holding member holds a first lens group and a second lens group, a mirror for bending an optical path being therebetween; and
   said first fly-eye lens, said second fly-eye lens, said first lens group, said mirror and said second lens group are arranged along said optical path.

5. A projection type display apparatus, comprising:
   a light source emitting an illumination light;
   an image display device forming an image by being irradiated with said illumination light;
   an illumination optical apparatus irradiating said illumination light from said light source to said image display device; and
   a projection optical system projecting an image formed by said image display device; wherein said illumination optical apparatus comprises
   a first fly-eye lens having a plurality of lens cells arranged along two directions orthogonal to each other and to said optical axis;
   a second fly-eye lens having a plurality of lens cells arranged along two directions orthogonal to each other and to said optical axis;
   a first lens holding member holding said first fly-eye lens;
   a second lens holding member joined to said first lens holding member, and holding said second fly-eye lens;
   a third lens holding member joined to said second lens holding member, and holding an optical lens;
   a first engaging member provided in a portion of said second lens holding member, where the portion faces to said first lens holding member and is aparted from an optical axis by a predetermined distance;
   a second engaging member provided in a portion of said second lens holding member, where the portion faces to said third lens holding member and is aparted from an optical axis by a predetermined distance;
   a first engaged portion to be engaged with said first engaging member, provided in a portion of said first lens holding member, where the portion faces to said second lens holding member;
   a second engaged portion to be engaged with said second engaging member, provided in a portion of said first lens holding member, where the portion faces to said second lens holding member; and
   an illumination area is formed as a result of each shape of a lens cell aperture of said first fly-eye lens being projected by said second fly-eye lens and said optical lens to be enlarged.

6. A projection type display apparatus as set forth in claim 5, wherein:
   said third lens holding member holds a first lens group and a second lens group, a mirror for bending an optical path being provided therebetween; and
   said first fly-eye lens, said second fly-eye lens, said first lens group, said mirror and said second lens group are arranged along said optical path.

7. A projection type display apparatus as set forth in claim 5, wherein a prism is arranged in an illumination light emission side of said second lens group.

* * * * *